(12) United States Patent
Kurashina

(10) Patent No.: US 6,310,459 B1
(45) Date of Patent: Oct. 30, 2001

(54) DC MOTOR CONTROL DEVICE AND CONTROL METHOD

(75) Inventor: Teruki Kurashina, Nagano-Ken (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 09/656,218

(22) Filed: Sep. 6, 2000

(30) Foreign Application Priority Data

Sep. 6, 1999 (JP) .................................................. 11-252126

(51) Int. Cl.[7] ...................................................... H02P 8/00
(52) U.S. Cl. .......................................... 318/685; 318/696
(58) Field of Search .................................... 318/685, 686, 318/687, 696, 603, 254; 346/134, 136, 138; 347/19; 400/902, 903

(56) References Cited

U.S. PATENT DOCUMENTS 5,029,264 * 7/1991 Ito et al. ............................... 318/685
5,936,371 * 8/1999 Bolash et al. ......................... 318/685

* cited by examiner

Primary Examiner—Khanh Dang
(74) Attorney, Agent, or Firm—Sughrue, Mion, Zinn, Macpeak & Seas, PLLC

(57) ABSTRACT

A DC motor control device and a DC motor control method are configured to calculate driving motion time and DC motor current flow per unit time, or DC motor total current flow and driving motion time, every continuous driving motion of the DC motor, and interpose a drive stopping time to stop the DC motor for a time corresponding to the calculated value every time before a subsequent driving motion starts. Alternatively, they are configured to interpose a drive stopping time to stop the DC motor for a time calculated by cumulating such time corresponding to the calculated value over a plurality of occurrences every time before a subsequent block of driving motions starts after each block of driving motions.

5 Claims, 21 Drawing Sheets

DC MOTOR CONTROL DEVICE AND CONTROL METHOD

BACKGROUND OF THE INVENTION

1. Field of the Invention

This invention relates to a DC motor control device and a DC motor control method especially for use as a countermeasure against heat generated at a carriage of a serial printer driven by a DC motor.

2. Related Background Art

First explained are general configuration of an ink jet printer using a DC motor control device and its control method.

FIG. 1 is a block diagram that shows general configuration of an ink jet printer.

The ink jet printer shown in FIG. 1 includes a paper feed motor (hereinafter also called a PF motor) 1 that feeds paper; a paper feed motor driver 2 that drives the paper feed motor 1; a carriage 3 that supports a head 9 fixed thereto to supply ink onto printing paper 50 and is driven to move in parallel to the printing paper 50 and vertically of the paper feeding direction; a carriage motor (hereinafter also called a CR motor) 4 that drives the carriage 3; a CR motor driver 5 that drives the carriage motor 4; a DC unit 6 that outputs a D.C. current for controlling the CR motor driver 5; a pump motor 7 that controls the draft of ink for the purpose of preventing clogging of the head 9; a pump motor driver 8 that drives the pump motor 7; a head driver 10 that drives and controls the head 9; a linear encoder 11 fixed to the carriage 3; a linear encoder coding plate 12 having slits in predetermined intervals; a rotary encoder 13 for the PF motor 1; a paper detecting sensor 15 that detects the terminal position of each sheet of paper under printing; a CPU 16 that controls the whole printer; a timer IC 17 that periodically generates interruption signals to the CPU 16; an interface portion (hereinafter also called IF) 19 that exchanges data with a host computer 18; an ASIC 20 that controls the character resolution, driving waveform of the head 9, and so on, in accordance with character information sent from the host computer 18 through the IF 19; a PROM 21, a RAM 22 and an EEPROM 23 that are used as an operation area of the ASIC 20 and the CPU 16 and a program storage area; a platen 25 that supports the printing paper 50; a transport roller 27 driven by the PF motor 1 to transport the printing paper 50; a pulley 30 attached to a rotating shaft of the CR motor 4; and a timing belt 31 driven by the pulley 30.

The DC unit 6 controls and drives the paper feed motor driver 2 and the CR motor driver 5 in response to a control instruction sent from the CPU 16 and outputs of the encoders 11, 13. Both the paper feed motor 1 and the CR motor 4 are DC motors.

FIG. 2 is a perspective view that illustrates configuration around the carriage 3 of the ink jet printer.

As shown in FIG. 2, the carriage 3 is connected to the carriage motor 4 by the timing belt 31 via the pulley 30, and driven to move in parallel with the platen 25 under guidance of a guide member 32. The carriage 3 has the recording head 9 projecting from its surface opposed to the printing paper and having a row of nozzles for releasing black ink and a row of nozzles for releasing color ink. These nozzles are supplied with ink from the ink cartridge 34 and release drops of ink onto the printing paper to print characters and images.

In a non-print area of the carriage 3, there is provided a capping device 35 for shutting nozzle openings of the recording head 9 when printing is not executed, and a pump unit 36 having the pump motor 7 shown in FIG. 1. When the carriage 3 moves from the print area to the non-print area, it contacts a lever, not shown, and the capping device 35 moves upward to close the head 9.

When any of the nozzle openings of the head 9 is clogged, or ink is forcibly released from the head 9 just after replacement of the cartridge 34, the pump unit 36 is activated while closing the head 9, and a negative pressure from the pump unit 36 is used to suck out ink from the nozzle openings. As a result, dust and paper powder are washed out from around the nozzle openings, and bubbles in the head 9, if any, are discharged together with the ink to the cap 37.

FIG. 3 is a diagram schematically illustrating configuration of the linear encoder 11 attached to the carriage 3.

The encoder 11 shown in FIG. 3 includes a light emitting diode 11a, collimator lens 11b and detector/processor 11c. The detector/processor 11c has a plurality of (four) photo diodes 11d, signal processing circuit 11e, and two comparators $11_{fA}$, $11_{fB}$.

When a voltage $V_{CC}$ is applied across opposite ends of the light emitting diode 11a through a resistor, light is emitted from the light emitting diode 11a. This light is collimated into parallel beams by the collimator lens 11b, and the beams pass through the coding plate 12. The coding plate 12 has slits in predetermined intervals (for example, in intervals of 1/180 inch).

Parallel beams passing through the coding plate 12 enter into photo diodes 11d through fixed slits, not shown, and are converted into electric signals. Electric signals output from these four photo diodes 11d are processes in the signal processing circuit 11e. Signals output from the signal processing circuit 11e are compared in the comparators $11_{fA}$, $11_{fB}$, and comparison results are output as pulses. Pulses ENC-A, ENC-B output from the comparators $11_{fA}$, $11_{fB}$ are outputs of the encoder 11.

FIGS. 4A and 4B are timing charts showing waveforms of two output signals from the encoder 11 during normal rotation of the CR motor and during its reverse rotation.

As shown in FIGS. 4A and 4B, in both normal rotation and reverse rotation of the CR motor, the pulse ENC-A and the pulse ENC-B are different in phase by 90 degrees. The encoder 4 is so configured that the pulse ENC-A is forward in phase by 90 degrees relative to the pulse ENC-B as shown in FIG. 4A when the CR motor 4 rotates in the normal direction, i.e., when the carriage 3 is moving in its main scanning direction whereas the pulse ENC-A is behind in phase by 90 degrees relative to the pulse ENC-B as shown in FIG. 4B when the CR motor 4 rotates in the reverse direction. Then, one period T of these pulses corresponds to each interval of the slits of the coding plate 12 (for example, 1/180 inch), and it is equal to the time required for the carriage 3 to move from a slit to another.

On the other hand, the rotary encoder 13 for the PF motor 1 has the same configuration as the linear encoder 11 except that the former is a rotatable disc that rotates in response to rotation of the PF motor 1, and the rotary encoder 13 also outputs two output pulses ENC-A, ENC-B. In ink jet printers, in general, slit interval of a plurality of slits provided on a coding plate of the encoder 13 for the PF motor 1 is 1/180 inch, and paper is fed by 1/1440 inch when the PF motor rotates by each slit interval.

FIG. 5 is a perspective view showing a part related to paper feeding and paper detection.

With reference to FIG. 5, explanation is made about the position of the paper detecting sensor 15 shown in FIG. 1.

In FIG. 5, a sheet of printing paper 50 inserted into a paper feed inlet 61 of a printer 60 is conveyed into the printer 60 by a paper feed roller 64 driven by a paper feed motor 63. The forward end of the printing paper 50 conveyed into the printer 60 is detected by an optical paper detecting sensor 15, for example. The paper 50 whose forward end is detected by the paper detecting sensor 15 is transported by a paper feed roller 65 driven by the PF motor 1 and a free roller 66.

Subsequently, ink is released from the recording head (not shown) fixed to the carriage 3 which moves along the carriage guide member 32 to print something on the printing paper 50. When the paper is transported to a predetermined position, the terminal end of the printing paper 50 currently under printing is detected by the paper detecting sensor 15. The printing paper 50 after printing is discharged outside from a paper outlet 62 by a discharge roller 68 driven by a gear 67C, which is driven by the PF motor 1 via gears 67A, 67B, and a free roller 69.

Next explained are configuration of the DC unit 6, which is a conventional DC motor control device for controlling the CR motor 4 of the above-explained ink jet printer, and a control method by the DC unit 6.

FIG. 6 is a block diagram showing configuration of the DC unit 6 as the conventional DC motor control device. FIG. 7 is a graph that shows motor current and motor speed of the CR motor 4 controlled by the DC unit 6.

The DC unit 6 shown in FIG. 6 includes a position operator 6a, a subtracter 6b, a target speed operator 6c, a speed operator 6d, a subtracter 6e, a proportional element 6f, an integral element 6g, a differential element 6h, an adder 6i, a D/A converter 6j, a timer 6k, and an acceleration controller 6m.

The position operator 6a detects rising edges and tail edges of the output pulses ENC-A and ENC-B of the encoder 11, then counts the number of edges detected, and operates the position of the carriage 3 from the counted value. This counting adds "+1" when one edge is detected while the CR motor 4 rotates in the normal direction, and adds "−1" when one edge is detected while the CR motor 4 rotates in the reverse direction. Period of pulses ENC-A and period of pulses ENC-B are equal to the slit interval of the coding plate 12, and the pulses ENC-A and ENC-B are different in phase by 90 degrees. Therefore, the count value "1" of that counting corresponds to ¼ of the slit interval of the coding plate 12. As a result, distance of the movement from the position of the carriage 3, at which the count value corresponds to "0", can be obtained by multiplying the above count value by ¼ of the slit interval. Resolution of the encoder 11 in this condition is ¼ of the slit interval of the coding plate 12. If the slit interval is 1/180 inch, then the resolution is 1/720 inch.

The subtracter 6b operates positional difference between the target position sent from the CPU 16 and the actual position of the carriage 3 obtained by the position operator 6a.

The target speed operator 6c operates the target speed of the carriage 3 from the positional difference output from the subtracter 6b. This operation is conducted by multiplying the positional difference by a gain $K_p$. This gain $K_p$ is determined in accordance with the positional difference, and the value of the gain $K_p$ is stored in a table, not shown. This table is located in the PROM 21 or the EEPROM 23 shown in FIG. 1, for example, and the gain K, is sent through the CPU 16.

The speed operator 6d operates the speed of the carriage 3 on the basis of output pulses ENC-A, ENC-B of the encoder 11. This speed is obtained in the following manner. First, rising edges and tail edges of output pulses ENC-A, ENC-B of the encoder 11 are detected, and the duration of time between edges corresponding to ¼ of the slit interval of the coding plate 12 is counted by a timer counter, for example. When the count value is T and the slit interval of the coding plate 12 is λ, the speed of the carriage is obtained as λ/(4T). Note here that operation of the speed is performed by measuring one period of output pulses ENC-A, e.g., from a rising edge to the next rising edge, by means of a timer counter.

The subtracter 6e operates speed difference between the target speed and the actual speed of the carriage 3 operated by the speed operator 6d.

The proportional element 6f multiplies the speed difference by a constant $G_p$, and outputs its multiplication result. The integral element 6g cumulates products of speed differences and a constant $Gi$. The differential element 6h multiplies the difference between the current speed difference and its preceding speed difference by a constant $Gd$, and outputs its multiplication result. Operations of the proportional element 6f, the integral element 6g and the differential element 6h are conducted in every period of output pulses ENC-A of the encoder 11, synchronizing with the rising edge of each output pulse ENC-A, for example.

Outputs of the proportional element 6f, the integral element 6g and the differential element 6h are added in the adder 6i. Then, the result of the addition, i.e., the drive current of the CR motor 4, is sent to the D/A converter 6j and converted into an analog current. Based on this analog current, the CR motor 4 is driven by the driver 5.

The timer 6k and the acceleration controller 6m are used for controlling acceleration whereas PID control using the proportional element 6f, the integral element 6g and the differential element 6h is used for constant speed and deceleration control during acceleration.

The timer 6k generates a timer interrupt signal every predetermined interval in response to a clock signal sent from the CPU 16.

The acceleration controller 6m cumulates a predetermined current value (for example 20 mA) to the target current value every time it receives the timer interrupt signal, and results of the integration, i.e, target current values of the DC motor during acceleration, are sent to the D/A converter 6j from time to time. Similarly to PID control, the target current value is converted into an analog current by the D/A converter 6j, and the CR motor 4 is driven by the driver 5 according to this analog current.

The driver 5 has four transistors, for example, and it can create (a) a drive mode for rotating the CR motor 4 in the normal or reverse direction; (b) a regeneration brake drive mode (a short brake drive mode, which is the mode maintaining a halt of the CR motor); and (c) a mode for stopping the CR motor, by turning those transistors ON or OFF in accordance with outputs from the D/A converter 6j. Further, the driver 5 is so configured that, in the drive mode for rotating the CR motor in the normal or reverse direction, it can supply a desired current to the CR motor 4 by changing intensities of signals applied to gates of those transistors.

Next explained is the performance of the DC unit 6, that is, the conventional DC motor control method, with reference to FIGS. 7A and 7B.

While the CR motor 4 stops, when a start instruction signal for starting the CR motor 4 is sent from the CPU 16 to the DC unit 6, a start initial current value $I_0$ is sent from the acceleration controller 6m to the D/A converter 6j. This start initial current value $I_0$ is sent together with the start instruction signal from the CPU 16 to the acceleration controller 6m. Then, this current value $I_0$ is converted into an analog current by the D/A converter 6j and sent to the driver 5 which in turn start the CR motor 4 (see FIGS. 7A and 7B). After the start instruction signal is received, the timer interrupt signal is generated every predetermined interval from the timer 6k. The acceleration controller 6m cumulates a predetermined current value (for example, 20 mA) to the start initial current value $I_0$ every time it receives the timer interrupt signal, and sends the cumulated current value to the D/A converter 6j. Then, the cumulated current value is converted into an analog current by the D/A converter 6j and sent to the driver 5. Then, the CR motor is driven by the driver 5 so that the value of the current supplied to the CR motor 4 becomes the cumulated current value mentioned above, and the speed of the CR motor 4 increases (see FIG. 7B). Therefore, the current value supplied to the CR motor 4 represents a step-like aspect as shown in FIG. 7A. At that time, the PID control system also works, but the D/A converter 6j selects and employs the output from the acceleration controller 6m.

Cumulative processing of current values of the acceleration controller 6m is continued until the cumulated current value reaches a fixed current value $I_s$. When the cumulated current value reaches the predetermined value $I_s$ at time t1, the acceleration controller 6m stops its cumulative processing, and supplies the fixed current value $I_s$ to the D/A converter 6j. As a result, the CR motor 4 is driven by the driver 5 such that the value of the current supplied to the CR motor 4 becomes the current value $I_s$ (see FIG. 7A).

In order to prevent the speed of the CR motor 4 from overshooting, if the speed of the CR motor 4 increases to a predetermined value V1 (see time t2), the acceleration controller 6m makes a control to reduce the current supplied to the CR motor 4. At that time, the speed of the CR motor 4 further increases, but when it reaches a predetermined speed Vc (see time t3 of FIG. 7B), the D/A converter 6j selects the output of the PID control system, i.e., the output of the adder 6i, and PID control is effected.

That is, based on the positional difference between the target position and the actual position obtained from the output of the encoder 11, the target speed is operated, and based on the speed difference between this target speed and the actual speed obtained from the output of the encoder 1, the proportional element 6f, the integral element 6g and the differential element 6h act to perform proportional, the integral and the differential operations, respectively, and based on the sum of results of these operations, the CR motor 4 is controlled. These proportional, integral and differential operations are conducted synchronously with the rising edge of the output pulse ENC-A of the encoder 11, for example. As a result, speed of the DC motor 4 is controlled to be a desired speed Ve. The predetermined speed Vc is preferably a value corresponding to 70 through 80% of the desired speed Ve.

From time t4, the DC motor 4 reaches the desired speed, and the carriage 3 also reaches the desired constant speed Ve and can perform printing.

When the printing is completed and the carriage 3 comes close to the target position (see time t5 in FIG. 7B), the positional difference becomes smaller, and the target speed also becomes slower. Therefore, the speed difference, i.e., the output of the subtracter 6e becomes a negative value, and the DC motor 4 is decelerated and stops at time t6.

However, the control of the DC motor by the above-reviewed conventional DC motor control device and control method involved the problem that thermal resistance increased by heat generation of the DC motor caused by its continuous motion, and disturbed a sufficient flow of electric current into the DC motor. Insufficient flow of the current into the DC motor resulted in degrading the control accuracy of the CR motor that was a DC motor, and deteriorating the printing performance of the ink jet printer.

As its countermeasures, braking during the driving motion or limitation of the continuous printing length, for example, was employed conventionally. However, there remained the problem that the whole driving motion time largely increased.

SUMMARY OF THE INVENTION

It is therefore an object of the invention to provide a DC motor control device and a DC motor control method capable of alleviating heat generation of a DC motor to be controlled, while preventing that the entire driving motion time increases.

DC motor control device and control method according to the first aspect of the invention are characterized in computing the driving motion time and the DC motor current flow in each unit time, or the DC motor total current flow and the driving motion time, for each continuous driving motion of the DC motor, and setting a drive stop time for stopping the driving motion of the DC motor for a time corresponding to the calculated value after each continuous driving motion before starting the next driving motion. As a result, while preventing that the entire driving motion time increases, heat generation of the DC motor can be alleviated.

DC motor control device and control method according to the second aspect of the invention are characterized in computing the driving motion time and the DC motor current flow in each unit time, or the DC motor total current flow and the driving motion time, for each continuous driving motion of the DC motor, and setting a drive stop time for stopping the driving motion of the DC motor for a time obtained by cumulating the time corresponding to the calculated value over a plurality of times, after every some continuous driving motions before starting the next driving motion. As a result, while preventing that the entire driving motion time increases more effectively, heat generation of the DC motor can be alleviated.

Each continuous driving motion pertains to the motion from the start of one driving motion to the end of the same driving motion.

DESCRIPTION OF THE PREFERRED EMBODIMENTS

With reference to the drawings, embodiments of the DC motor control device and control method according to the invention are explained below.

Figure 8:
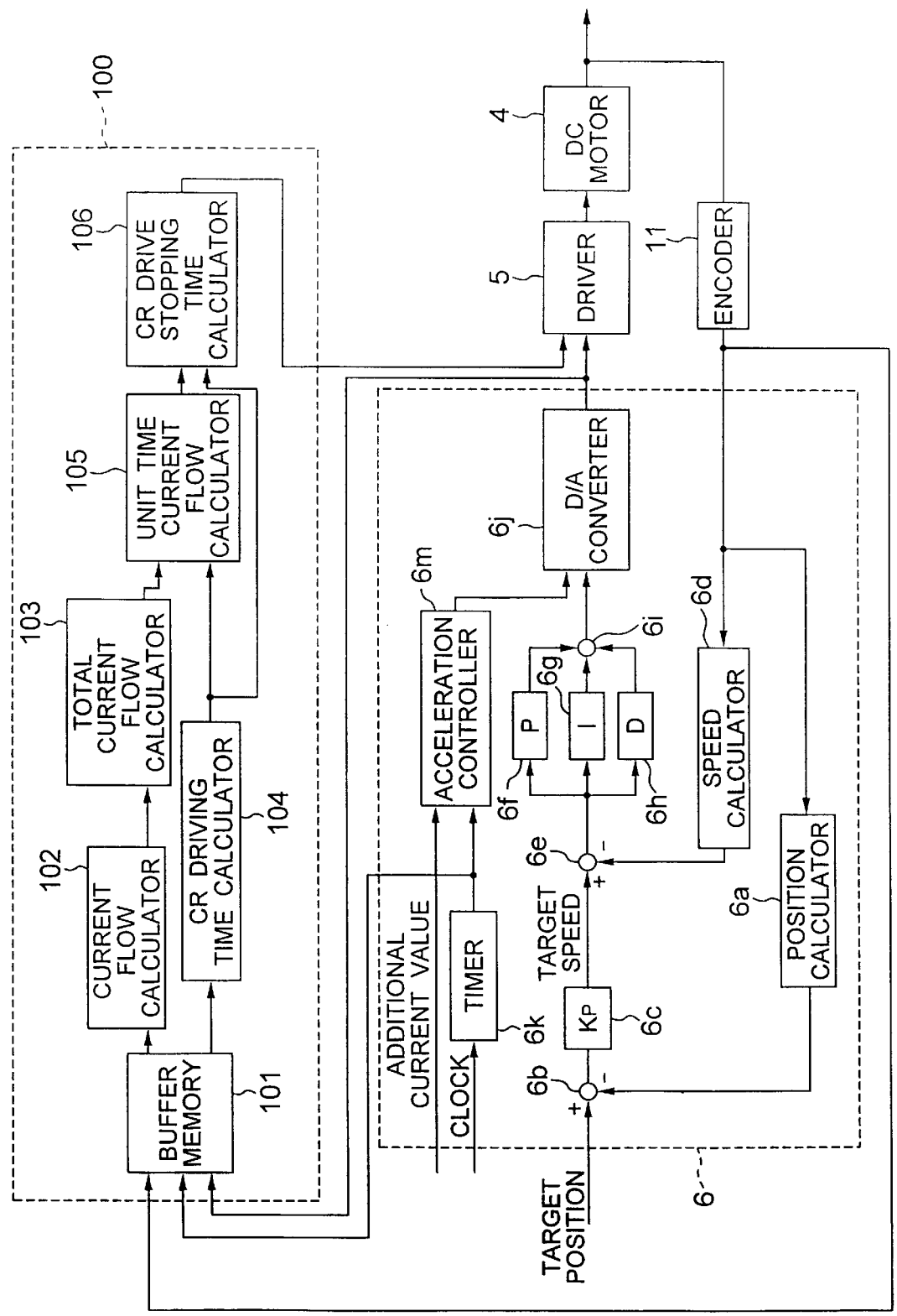
FIG. 8 is a block diagram that illustrates configuration of a DC motor control device according to the first embodiment of the invention.

FIG. 8 is a block diagram that illustrates configuration of a DC motor control device according to the first embodiment of the invention.

Figure 1:
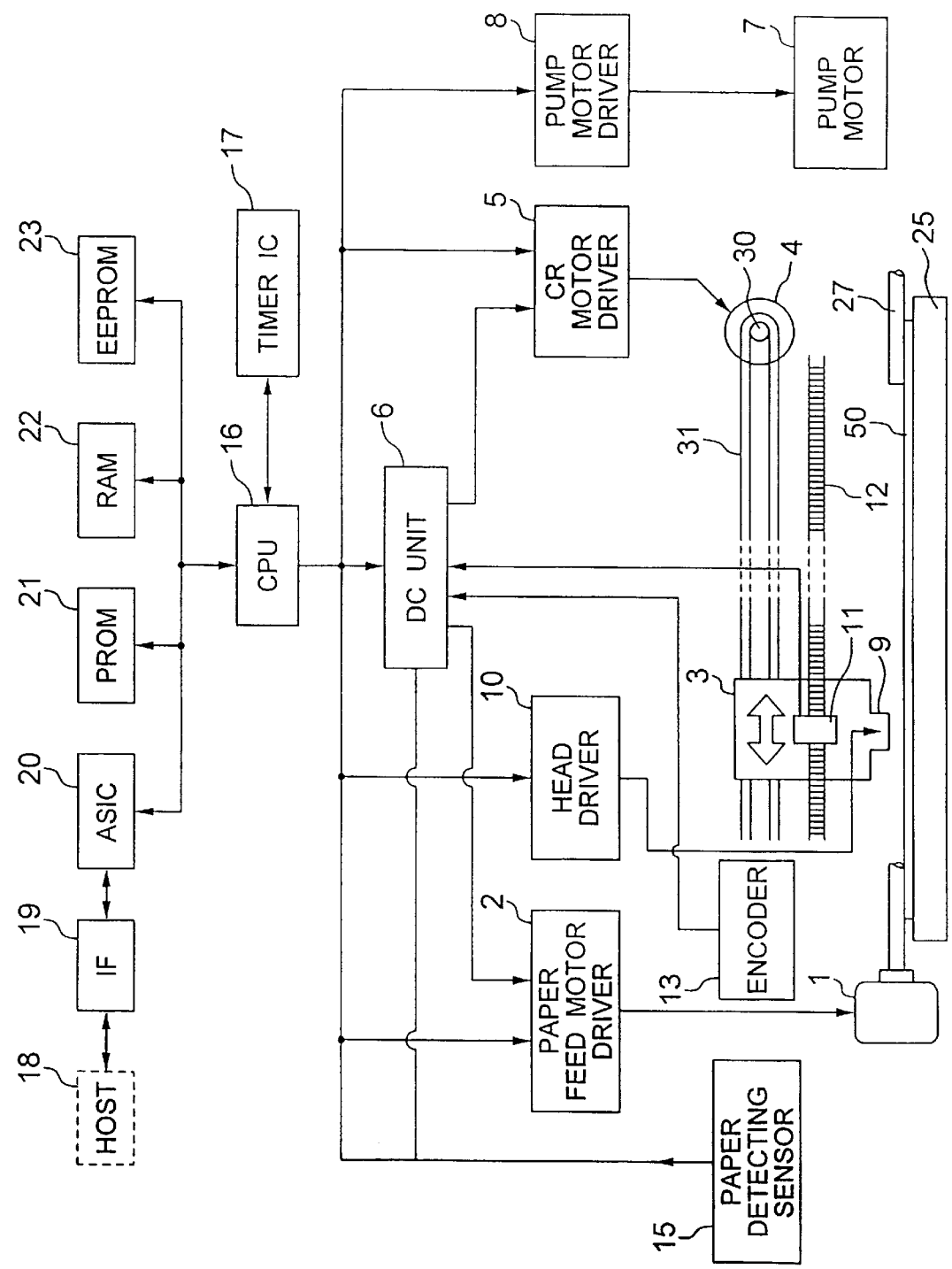
FIG. 1 is a block diagram that shows general configuration of an ink jet printer.
Figure 2:
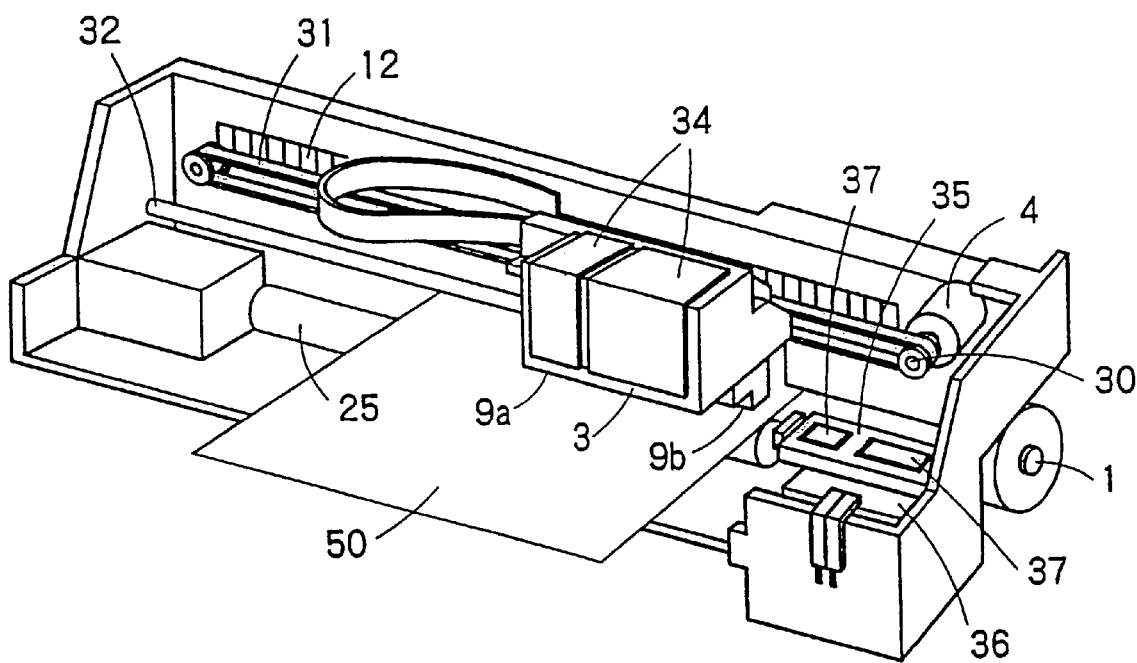
FIG. 2 is a perspective view that shows configuration around a carriage 3 of the ink jet printer.
Figure 3:
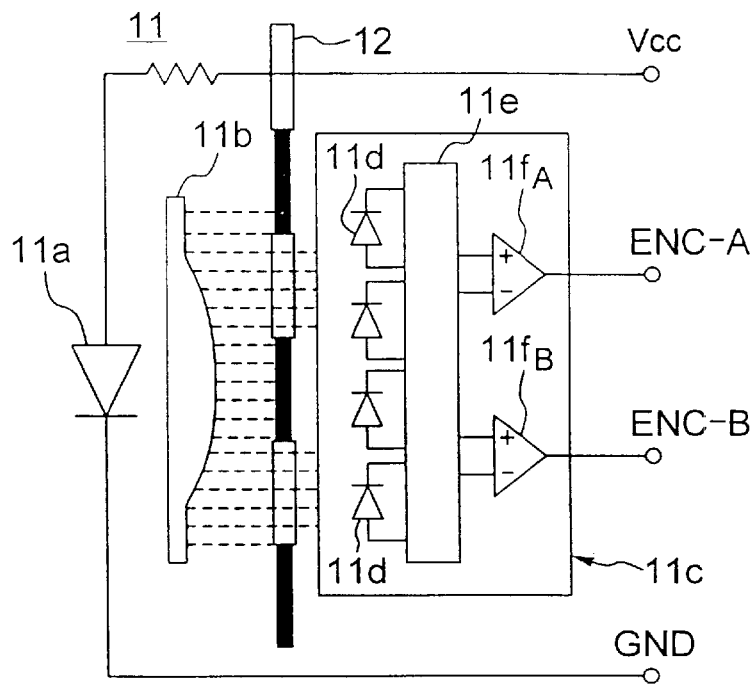
FIG. 3 is an explanatory diagram that schematically shows configuration of a linear encoder 11 attached to the carriage 3.
Figure 4A:
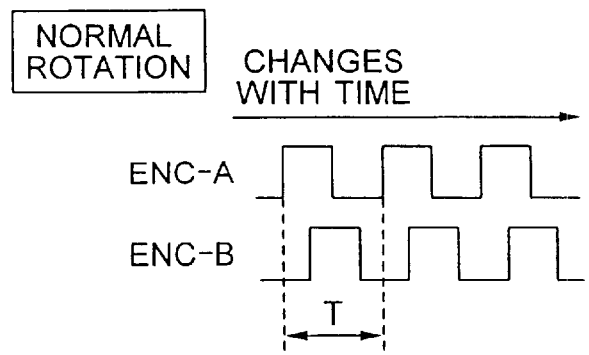
FIGS. 4A and 4B are timing charts that show waveforms of two output signals from the encoder 11 during normal rotation and reverse rotation of the CR motor, respectively.
Figure 4B:
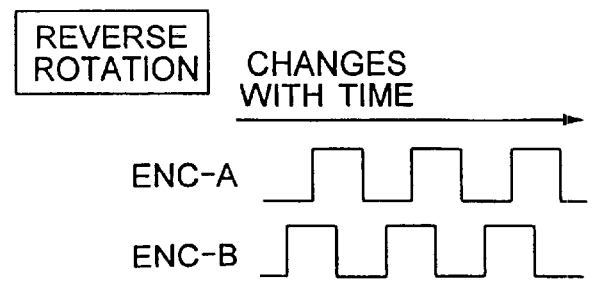
Figure 5:
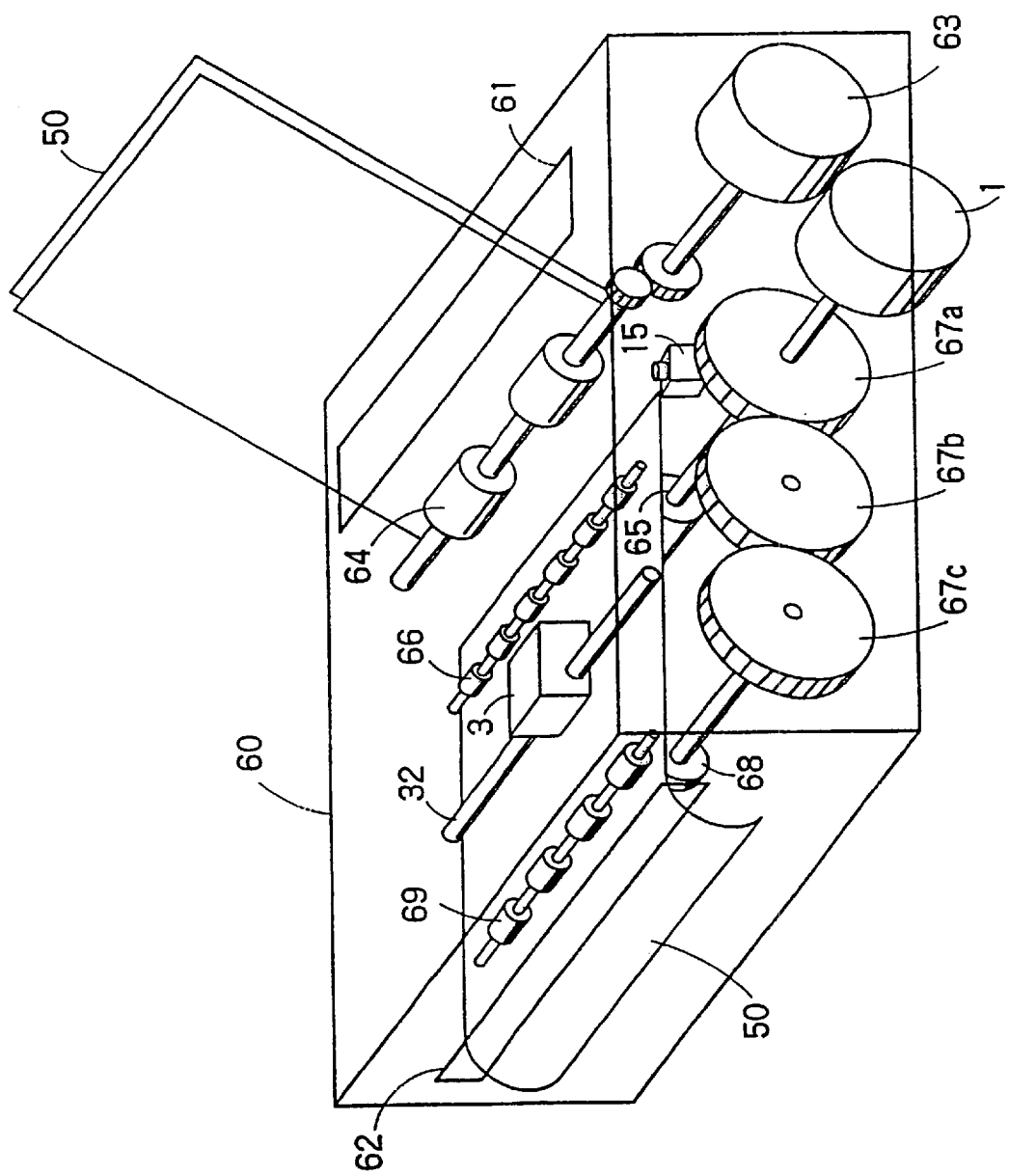
FIG. 5 is a perspective view that shows a part working upon supplying and detecting paper.
Figure 6:
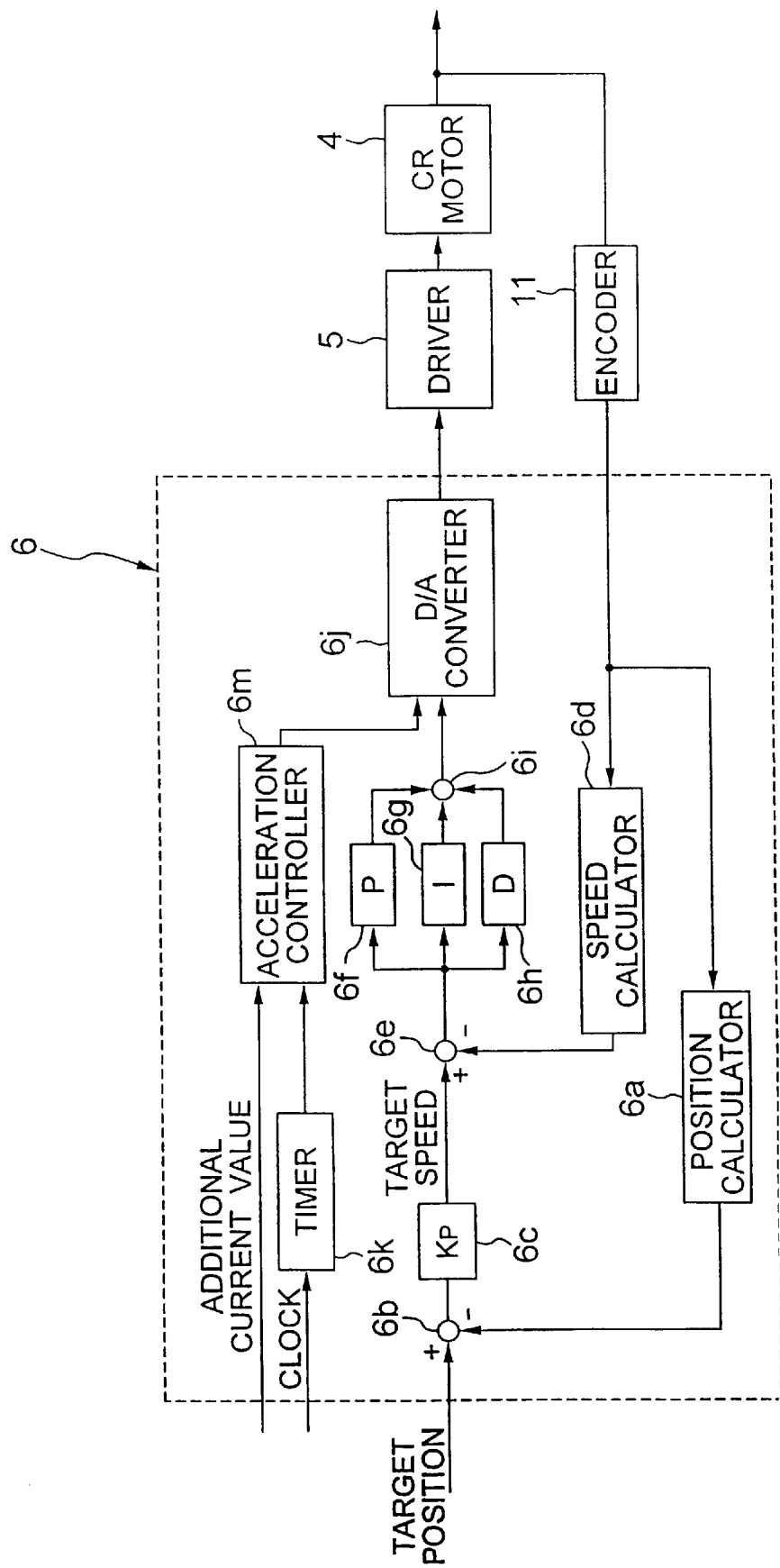
FIG. 6 is a block diagram that shows configuration of the DC unit 6 as a conventional DC motor control device.
Figures 7A, 7B:
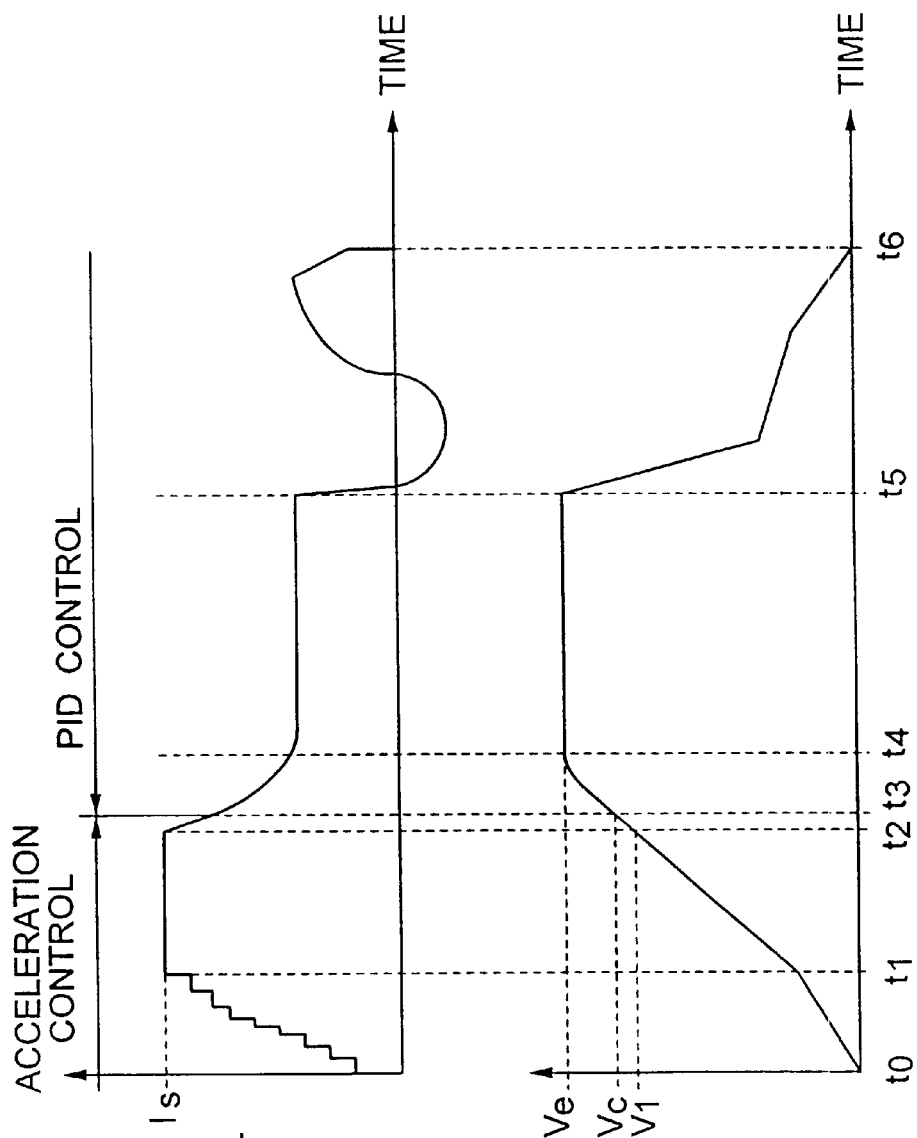
FIGS. 7A and 7B are graphs that show motor current and motor speed of a CR motor 4 controlled by the DC unit 6.

The DC motor control device according to the first embodiment of the invention shown in FIG. 8 includes a DC unit 6, and a carriage drive stopping time calculation unit 100 added to the DC unit 6. Configuration of the DC unit 6 is the same as configuration of the DC unit 6 in the conventional DC motor control device shown in FIG. 6, and includes a position operator 6a, a subtracter 6b, a target speed operator 6c, a speed operator 6d, a subtracter 6e, a proportional element 6f, an integral element 6g, a differential element 6h, an adder 6i, a D/A converter 6j, a timer 6k and an acceleration controller 6m. Its DC motor 4, driver 5 and encoder 11 are also the same as those used in the conventional ink jet printer, and the DC motor 4 is a CR (carriage) motor.

The carriage drive stopping time calculation unit 100 is composed of a buffer memory 101 that stores and holds timer interrupt timings from the timer 6k, encoder interrupt timings from the encoder 11, and output values of the D/A converter (hereinafter also called DAC output values) at the timer interrupt timings and the encoder interrupt timings, and outputs them under a predetermined drive stopping judgment condition; a current flow calculator 102 that calculates the DC motor current flow in each period of interrupt timings from the interval of the timer the interrupt timings or the encoder interrupt timings and the DAC output values; a total current flow calculator 103 that calculates the DC motor total current flow in each continuous driving motion from the DC motor current flow in each period; a CR driving time calculator 104 that calculates a continuous driving motion time from the intervals between the timer interrupt timings or the encoder interrupt timings; a unit time current flow calculator 105 that calculates the DC motor current flow in each unit time from the DC motor total current flow and the driving motion time; and a CR drive stopping time calculator 106 that calculates the CR drive stopping time to stop the CR driving for between one driving motion and the next driving motion from the driving motion time and the DC motor current flow per unit time.

Figure 9:
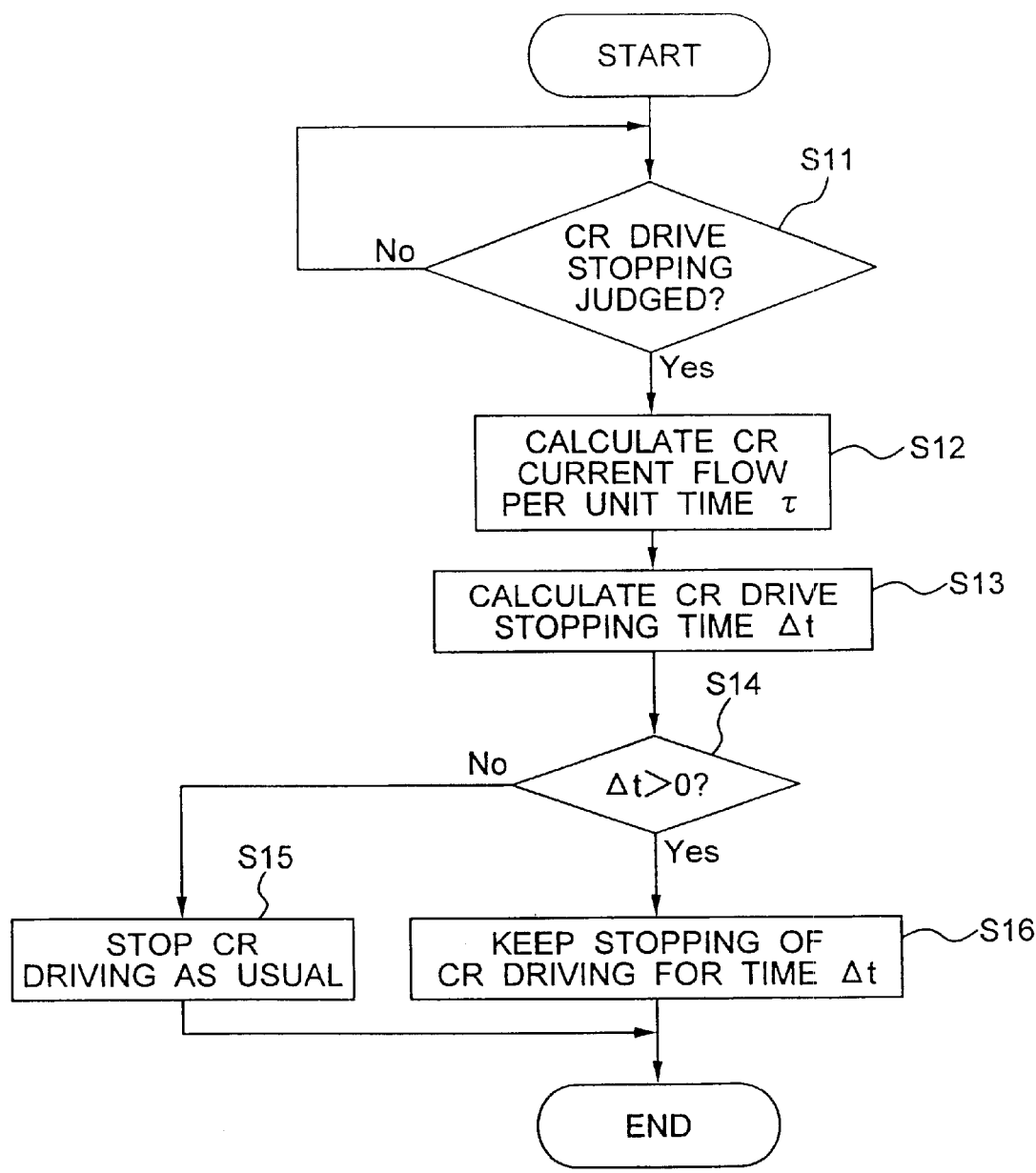
FIG. 9 is a flow chart that shows behaviors of the DC motor control device according to the first embodiment of the invention.
Figure 10:
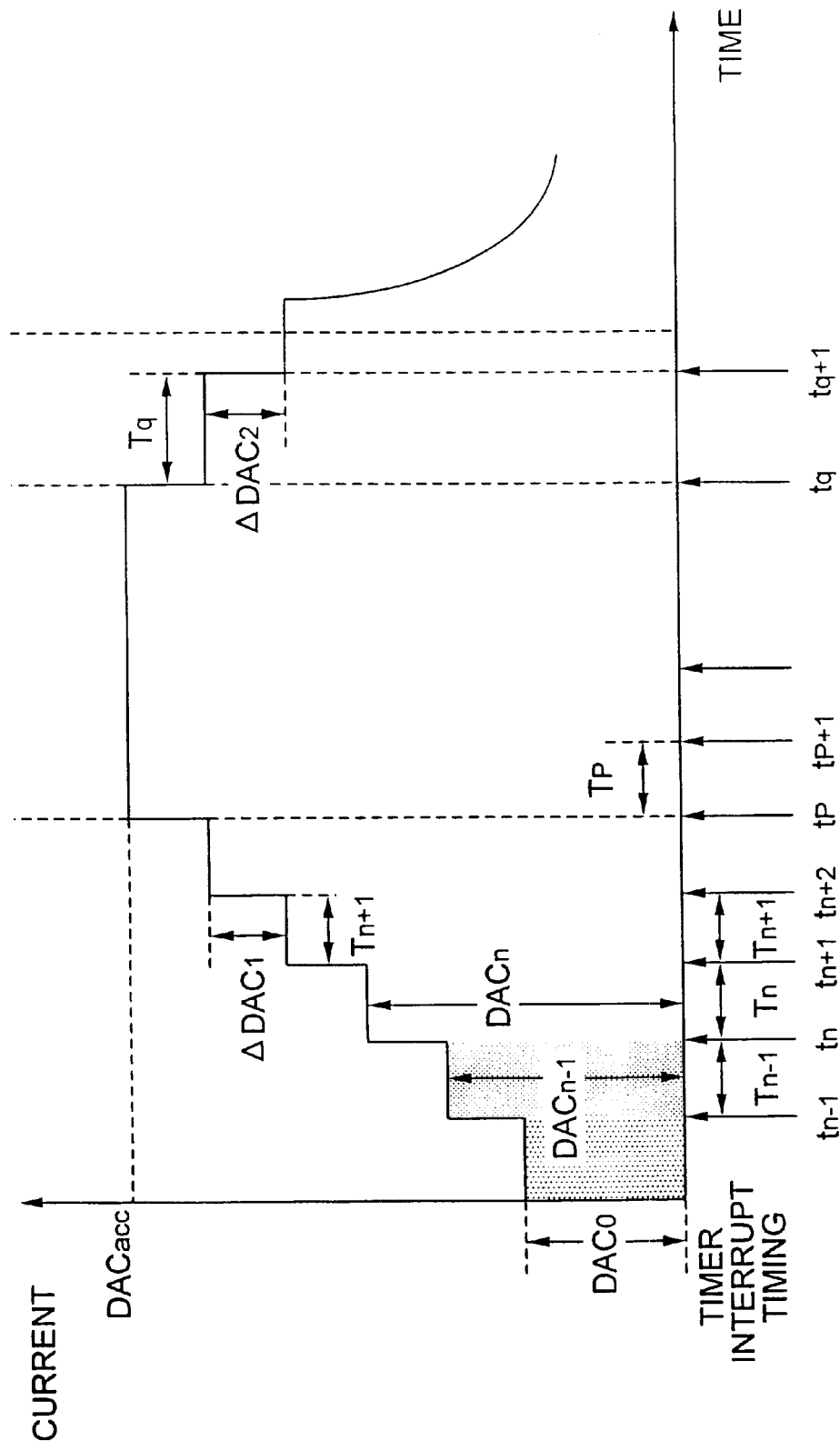
FIG. 10 is a graph that shows a method for calculating the DC motor current flow in the period of a timer interrupt motion.
Figure 11:
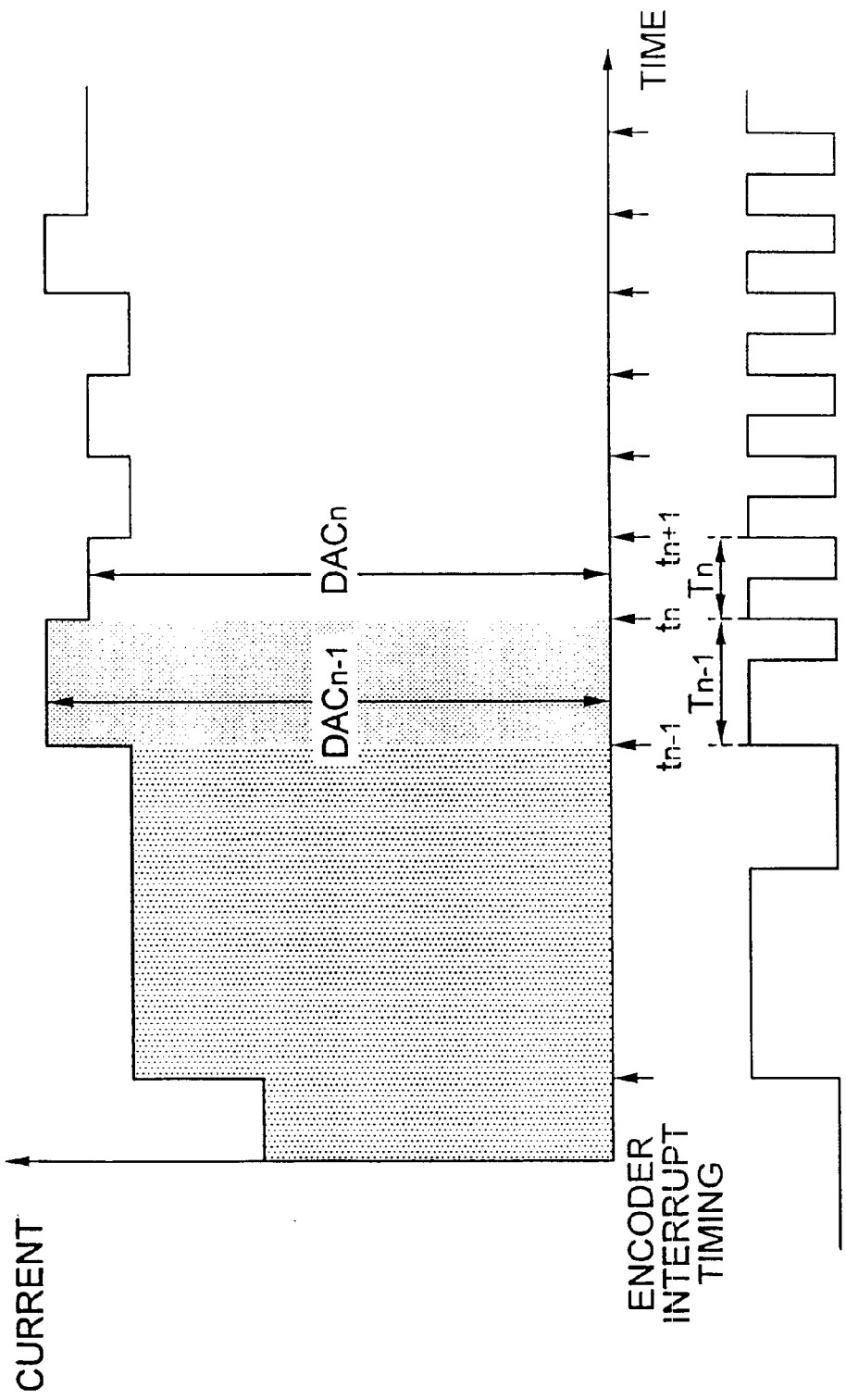
FIG. 11 is a graph that shows a method for calculating the DC motor current flow in the period of an encoder interrupt motion.
Figure 12:
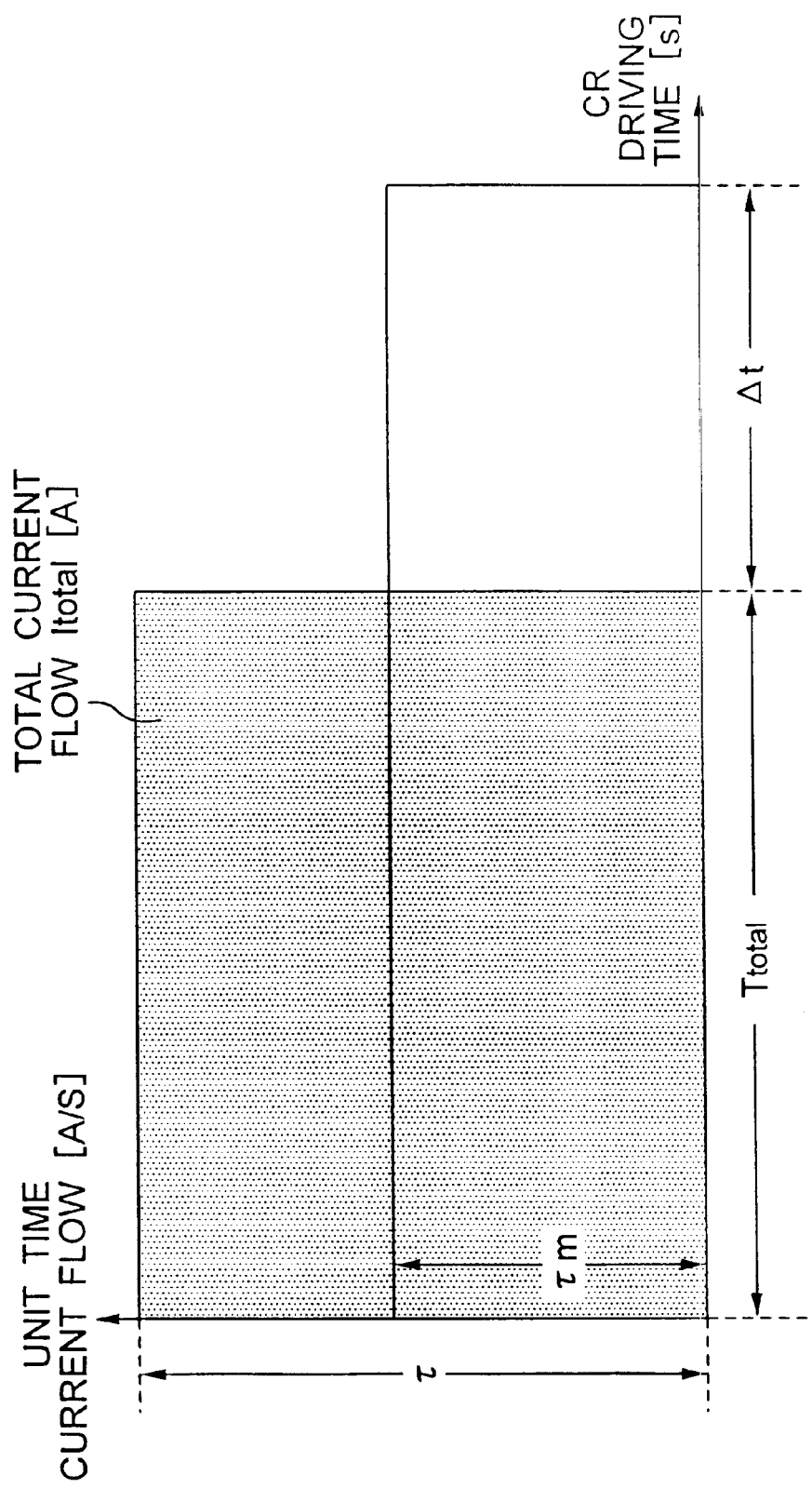
FIG. 12 is a graph that shows a method for calculating the CR drive stopping time from the DC motor current flow per unit time.

FIG. 9 is a flow chart that shows behaviors of the DC motor control device according to the first embodiment of the invention, namely, procedure of the DC motor control method according to the first embodiment of the invention. FIG. 10 is a graph that shows a method for calculating the DC motor current flow in the period of a timer interrupt motion, FIG. 11 is a graph that shows a method for calculating the DC motor current flow in the period of an encoder interrupt motion, and FIG. 12 is a graph that shows a method for calculating the CR drive stopping time from the DC motor current flow per unit time.

Referring to FIGS. 8 through 12, explanation is made about behaviors of the DC motor control device according to the first embodiment of the invention, that is, a DC motor control method according to the first embodiment of the invention.

Once the DC motor is driven by a start instruction signal to the DC motor and driving of the carriage is started, every time when the timer interrupt from the timer 6k or the encoder interrupt from the encoder 11 occurs, such timings and DAC output values at each timing are stored and held in the buffer memory 101.

After a driving motion is started, the buffer memory 101 outputs the timer interrupt timings, the encoder interrupt timings and the DAC output values at respective timings under a predetermined drive stopping judgment condition (step S11). The predetermined drive stopping judgment condition may be the status where timer interrupt does not occur and reverse rotation of the encoder is detected, or timer interrupt does not occur and encoder interrupt does not occur for a predetermine duration of time (for example, 5 ms). That is, if reverse rotation of the encoder is detected or encoder interrupt does not occur for a predetermined time after the process shifts from timer interrupt control to encoder interrupt control, the buffer memory 101 considers that CR drive stopping judgment has been done, and outputs the respective timings and the DAC output values.

Once the CR drive stopping judgment is done and the timer interrupt timings, the encoder interrupt timings and the DAC output values at respective timings are output, the DC motor current flow (CR current flow) per unit time τ is calculated by a series of actions of the current flow calculator 102, the total current flow calculator 103, the CR driving time calculator 104, and the unit time current flow calculator 105 (step S12).

In order to calculate the DC motor current flow per unit time, the DC motor current flow between interrupt timings, the DC motor total current flow in each continuous driving motion and the time of each continuous driving motion must be obtained.

First explained below is a method for calculating the DC motor current flow between respective interrupt timings in the timer interrupt control period and the encoder interrupt control period.

In the timer interrupt control period, as shown in FIG. 10, timer interrupt occurs every predetermined time. Assume here that the DC motor current flow in the period between each interrupt timing and the preceding interrupt timing is calculated. The DC motor current flow in the period from the nth interrupt timing and the preceding (n−1)th timing, i.e., the period from time $t_{n-1}$ to time $t_n$, can be obtained by multiplying the time $T_{n-1}$ of the period by the DAC out value DACn-1 in the period. That is, the current flow $I_n$ calculated at the nth interrupt timing is $I_n=T_{n-1} \times DACn-1$. Similarly, the current flow $I_{n+1}$ calculated at the (n+1)th timing is $I_{n+1}=T_n \times DACn$.

Alternatively, the DC motor current flow at each timing may be obtained by conducting multiplication only of the increased or decreased amount from the current value at the immediately preceding period and adding or subtracting the increased or decreased amount to or from the current flow in the immediately preceding period. If the period from time $t_{n+1}$ to time $t_{n+2}$ is $T_{n+1}$, and the increased amount of the current value is ΔDAC1, then the current flow $I_{n+2}$ calculated at the (n+2)th interrupt timing is $I_{n+2}=I_{n+1}+T_{n+} \times \Delta DAC1$. Assuming that the DAC output value becomes a constant acceleration current value DACacc from time $t_p$ to time $t_q$ ($t_p < t_q$), the time of the period from time $t_q$ to time $t_{q+1}$, is $T_q$, and the decreased amount of the current value is ΔDAC2, then the current flow $I_{q+1}$ calculated at the (q+1)th interrupt timing is $I_{q+}=I_{q+Tq} \times (-\Delta DAC2)$.

The current flow is constant in each period from time $t_p$ in which the DAC output value becomes a constant acceleration current value DACacc to time $t_q$. For example, the time of the period from time $t_p$ to time $t_{p+}$ is $T_p$, the current flow $I_{p+1}$ calculated at the (P+1)th interrupt timing is $I_{p+1}=T_p \times DACacc$. The length of the period between certain interrupt timings in the timer interrupt control period is equal to any other such period.

On the other hand, in the encoder interrupt control period, as shown in FIG. 11, encoder interrupt occurs in inconstant intervals in response to rotation speeds of the DC motor. However, the method for calculating the DC motor current flow between any interrupt timings is the same as the method of the timer interrupt control period, and for individual interrupt timings, the DC motor current flow is calculated in the period from their immediately preceding interrupt timings. The DC motor current flow in the period from the nth interrupt timing and the preceding (n−1)th timing, i.e., the period from time $t_{n-1}$ to time $t_n$ can be obtained by multiplying the time $T_{n-1}$ of the period and the DAC output value DACn-1 in the period. That is, the current flow In calculated at the nth interrupt timing is $I_n=T_{n-1} \times DACn-1$. Similarly, the current flow $I_{n+}$ calculated at the (n+1)th interrupt timing is $I_{n+}=T_n \times DACn$.

As explained above, the DC motor total current flow $I_{total}$ in a continuous driving motion is calculated by calculating the amount of DC motor current flow in the period between interrupt timings in a continuous driving motion and then adding all such amounts of DC motor current flow. Further, the time $T_{total}$ of a continuous driving motion is calculated by adding all lengths of time between interrupt timings in such continuous driving motion. Then, the DC motor current flow per unit time $\tau=I_{total}/T_{total}$ time in a continuous driving motion is calculated from the DC motor total current flow $I_{total}$ and the driving motion time $T_{total}$.

After the DC motor current flow per unit time τ is calculated, the CR drive stopping time Δt is calculated from the driving motion time $T_{total}$ in a continuous driving motion and the DC motor current flow per unit time τ (step S13). Referring to FIG. 12, a method for calculating the CR drive stopping time Δt is explained.

When the DC motor current flow per unit time τ is small, heat generation of the DC motor is small. If the DC motor current flow per unit time τ is large, heat generation of the DC motor increases responsively, and insufficient flow of electric current into the DC motor occurs as explained before. Taking it into consideration, the DC motor current flow threshold value per unit time $\tau_{th}$ is determined previously so as to provide the CR drive stopping time Δt for stopping the driving motion of the DC motor when the DC motor current flow per unit time τ exceeds a predetermined value.

The total current flow that flows when electric current is supplied by the DC motor current flow per unit time τ for the driving motion time $T_{total}$ is the DC motor total current flow $I_{total}$. However, the time Δt in the time $T_{total}+\Delta t$ required for flowing the DC motor total current flow $I_{total}$ by the threshold value $\tau_{th}$ is determined to be the CR drive stopping time Δt. That is, the following equations establish.

$$\tau_{th} \times (T_{total} \, \Delta t) = \tau \times T_{total} = I_{total}$$

$$T_{total} + \Delta t = (\tau/\tau_{th}) \times T_{total} = I_{total}/\tau_{th}$$

$$\Delta T = (\tau/\tau_{th}) \times T_{total} - T_{total}$$

$$= ((\tau/\tau_{th})-1) \times T_{total}$$

$$= I_{total}/\tau_{th} - T_{total} \qquad (1)$$

Therefore, the CR drive stopping time Δt can be calculated also from the DC motor total current flow $I_{total}$ in a continuous driving motion and the drive motion time $T_{total}$. However, in the first embodiment, the CR drive stopping time Δt is calculated from the driving motion time $T_{total}$ in a continuous driving motion and the DC motor current flow per unit time τ. From the equation (1), if the DC motor current flow per unit time τ is larger than the threshold value $\tau_{th}$, then Δt>0. If the DC motor current flow per unit time τ is smaller than the threshold value $\tau_{th}$ then Δ t<0. Further, if the DC motor current flow per unit time τ is equal to the threshold value $\tau_{th}$, then Δt=0. It is also possible to say that, when $I_{total}/\tau_{th}>T_{total}$, then Δt>0 when $I_{total}/\tau_{th}<T_{total}$, then Δ<0, and when $I_{total}/\tau_{th}=T_{total}$, then Δt=0.

Taking it into consideration, subsequent driving control is performed in response to the calculated value of the CR drive stopping time Δt. That is, it is reviewed whether the CR drive stopping time Δt is a positive value (Δt>0) or not (step S14), and if the CR drive stopping time Δt is 0 or a lower value (Δt≦0), the control moves to the subsequent driving motion immediately after interruption of the CR driving in the usual manner without interposing the CR drive stopping time (step S15).

On the other hand, when the CR drive stopping time Δt is a positive value (Δt>0), the carriage is kept stopping for the CR drive stopping time Δt after the CR drive stops (step S16). Since the DC motor is cooled in the CR drive stopping time Δt, insufficient flow of electric current into the DC motor caused by heat generation of the DC motor by its continuous motion can be prevented. Further, after one driving motion stops and before the subsequent driving motion starts, instead of unconditionally interposing a constant CR drive stopping time, the carriage is kept stopping for the CR drive stopping time Δt only when the calculated CR drive stopping time Δt is a positive value. Therefore, increase of the driving motion time can be prevented as a whole. After the CR drive stopping time Δt lapses, the control moves to the subsequent drive motion.

Figure 13:
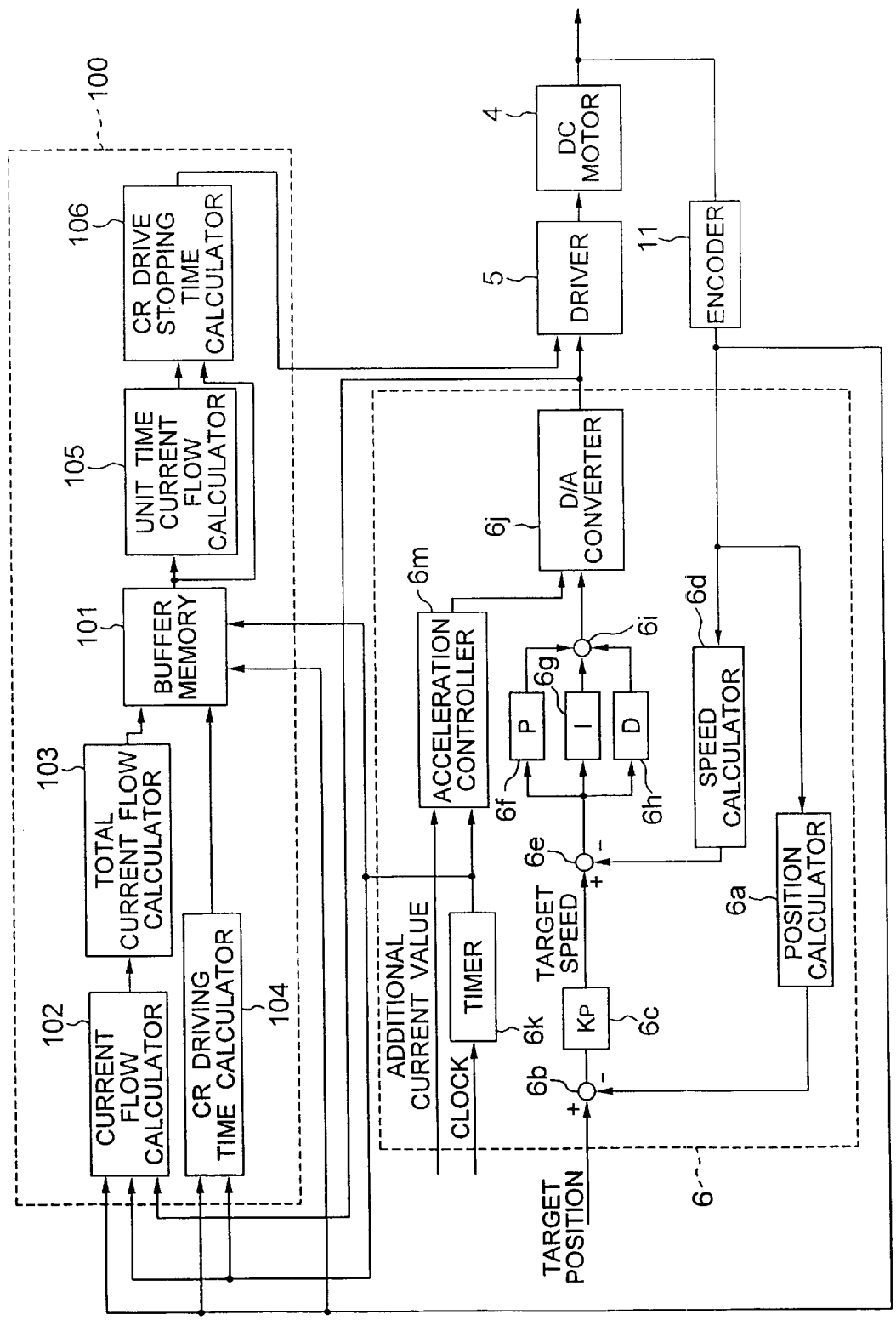
FIG. 13 is a block diagram that shows configuration of a DC motor control device according to the second embodiment of the invention.

FIG. 13 is a block diagram that shows configuration of a DC motor control device according to the second embodiment of the invention.

The DC motor control device according to the second embodiment of the invention shown in FIG. 13 is also composed of the DC unit 6, and the carriage drive stopping time calculating unit 100 added to the DC unit 6. Configuration of the DC unit 6 is the same as that of the first embodiment. However, it is different from the first embodiment in configuration of the carriage drive stopping time calculating unit 100.

The carriage drive stopping time calculation unit 100 in the second embodiment is composed of the current flow calculator 102 that calculates the DC motor current flow in each period between interrupt timings from the interval of timer interrupt timings from the timer 6k or encoder interrupt timings from the encoder 11 and DAC output values at the timer interrupt timings and the encoder interrupt timings; the total current flow calculator 103 that calculates the total DC motor current flow in each continuous driving motion from the DC motor current flow in each period; the CR driving time calculator 104 that calculates a continuous driving motion time from the intervals between the timer interrupt timings or the encoder interrupt timings; the buffer memory 101 that renews and stores the DC motor total current flow and the driving motion time at each timer interrupt timing or encoder interrupt timing and outputs them under a predetermined drive stopping judgment condition; the unit time current flow calculator 105 that calculates the DC motor current flow in each unit time from the DC motor total current flow and the driving motion time; and the CR drive stopping time calculator 106 that calculates the CR drive stopping time to stop the CR driving for between one driving motion and the next driving motion from the driving motion time and the DC motor current flow per unit time.

As explained above, in the DC motor control device according to the first embodiment of the invention, the timer interrupt timings, the encoder interrupt timings and the DAC output values at respective interrupt timings are stored, and according to a predetermined drive stopping judgment condition, the DC motor current flow, the DC motor total current flow and the driving motion time are calculated, the DC motor current flow per unit time τ is calculated, and the CR drive stopping time is further calculated.

In contrast, in the DC motor control device according to the second embodiment of the invention, after a driving motion is started, the DC motor current flow, the DC motor total current flow and the driving motion time are calculated at each interrupt timing by the current flow calculator 102, the current total flow calculator 103 and the CR drive time calculator 104, and the DC motor total current flow and the driving motion time are renewed and stored in the buffer memory 101 at each interrupt timing. Then, in response to the predetermined drive stopping judgement condition, the DC motor total current flow and the driving motion time are output from the buffer memory 101 to the unit time current flow calculator 105, and the driving motion time is output from the buffer memory 101 to the CR drive stopping time calculator 106. Subsequent calculation of numerical values and control operations are the same as those of the first embodiment. Therefore, the flow of proceedings of the DC motor control method according to the second embodiment of the invention appears identical to the flow shown in FIG. 9

Figure 14:
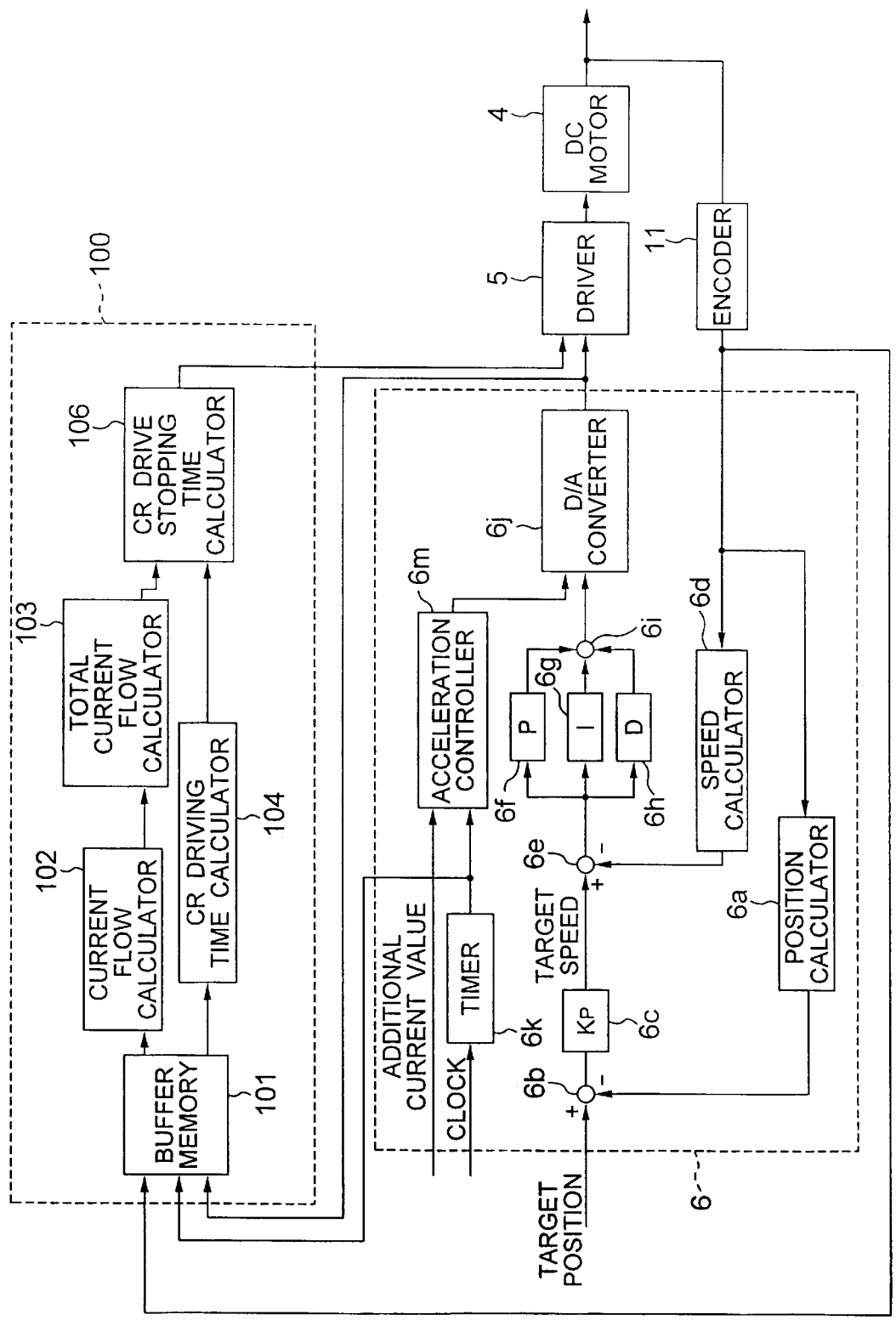
FIG. 14 is a block diagram that shows configuration of a DC motor control device according to the third embodiment of the invention.

FIG. 14 is a block diagram that shows configuration of a DC motor control device according to the third embodiment of the invention.

The DC motor control device according to the third embodiment of the invention shown in FIG. 14 is also composed of the DC unit 6 and the carriage drive stopping time calculating unit 100 added to the DC unit 6. Configuration of the DC unit 6 is the same as the first embodiment. However, configuration of the carriage drive stopping time calculating unit 100 is different from that of the first embodiment.

As understood from the equation (1) used in the explanation of the first embodiment, the CR drive stopping time Δt can be calculated from values of the DC motor total current flow $I_{total}$ and the driving motion time $T_{total}$ without calculating the DC motor current flow per unit time τ. Therefore, the carriage drive stopping time calculating unit 100 in the DC motor control device according to the third embodiment of the invention has the configuration omitting the unit time current flow calculator 105 from the carriage drive stopping time calculating unit 100 in the first embodiment.

That is, the carriage drive stopping time calculating unit 100 in the third embodiment is composed of the buffer memory 101 that stores and holds the timer interrupt timings from the timer 6k, the encoder interrupt timings from the encoder 11, and the DAC output values at the timer interrupt timings and the encoder interrupt timings, and outputs them under a predetermined drive stopping judgment condition; the current flow calculator 102 that calculates the DC motor current flow in each period of interrupt timings from the interval of the timer interrupt timings or the encoder interrupt timings and the DAC output values; the total current flow calculator 103 that calculates the DC motor total current flow in each continuous driving motion from the DC motor current flow in each period; the CR driving time calculator 104 that calculates a continuous driving motion time from the intervals between the timer interrupt timings or the encoder interrupt timings; and the CR drive stopping time calculator 106 that calculates the CR drive stopping time to stop the CR driving for between one driving motion and the next driving motion from the DC motor total current flow and the driving motion time.

Figure 15:
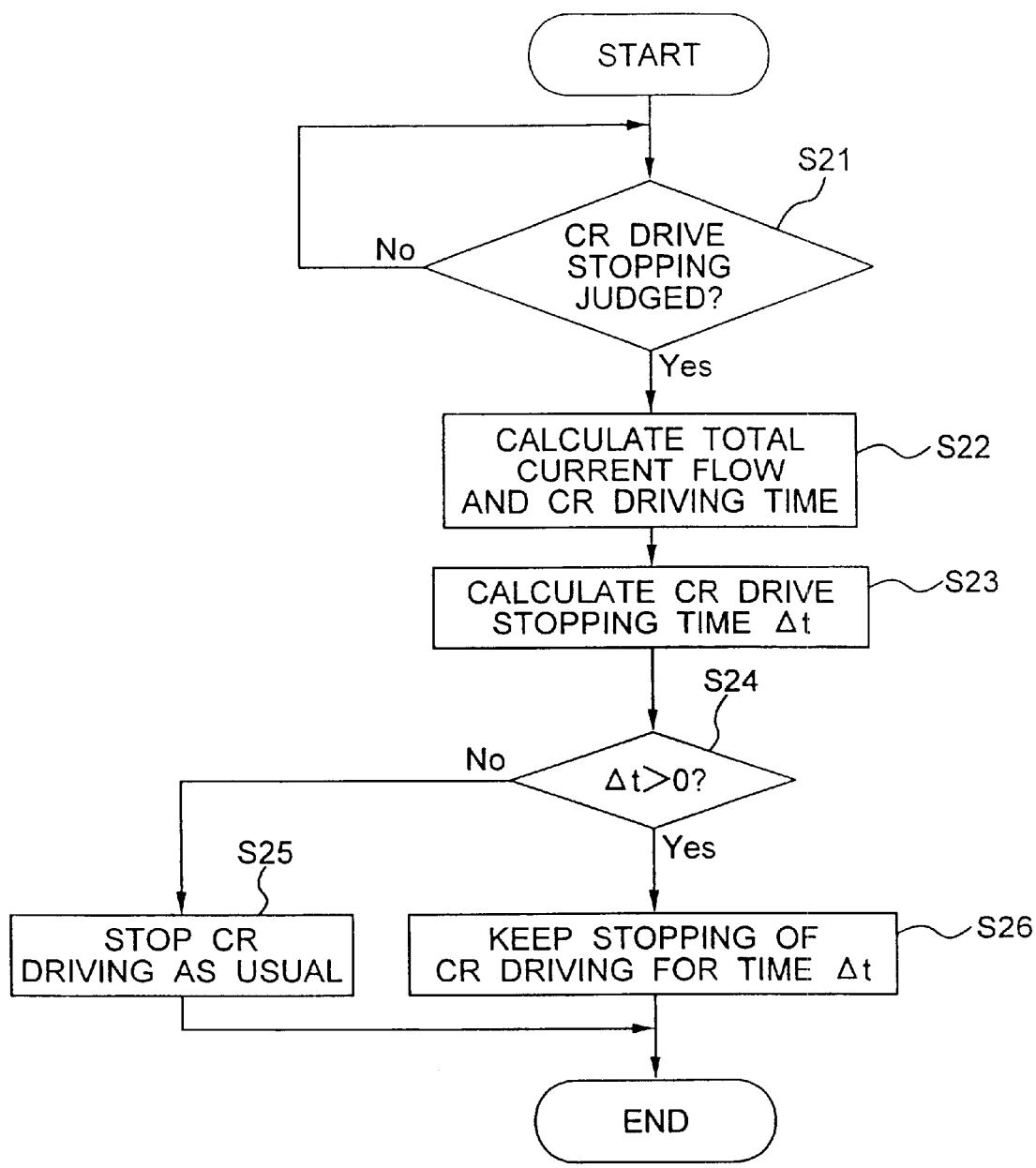
FIG. 15 is a flow chart that shows behaviors of the DC motor control device according to the third embodiment of the invention.

FIG. 15 is a flowchart that shows behaviors of the DC motor control device according to the third embodiment of the invention, i.e., proceedings of the DC motor control method according to the third embodiment of the invention.

Behaviors of the DC motor control device according to the third embodiment of the invention, i.e., proceedings of the DC motor control method according to the third embodiment of the invention, are identical to those of the first embodiment excepting that the CR drive stopping time Δt is calculated from values of the DC motor total current flow $I_{total}$ and the driving motion time $T_{total}$ (steps S22 and S23)

without calculating the DC motor current flow per unit time τ. It has been shown in the equation (1) in the explanation of the first embodiment already explained above that the CR drive stopping time Δt can be calculated directly from values of the DC motor total current flow $I_{total}$ and the driving motion time $T_{total}$.

Figure 16:
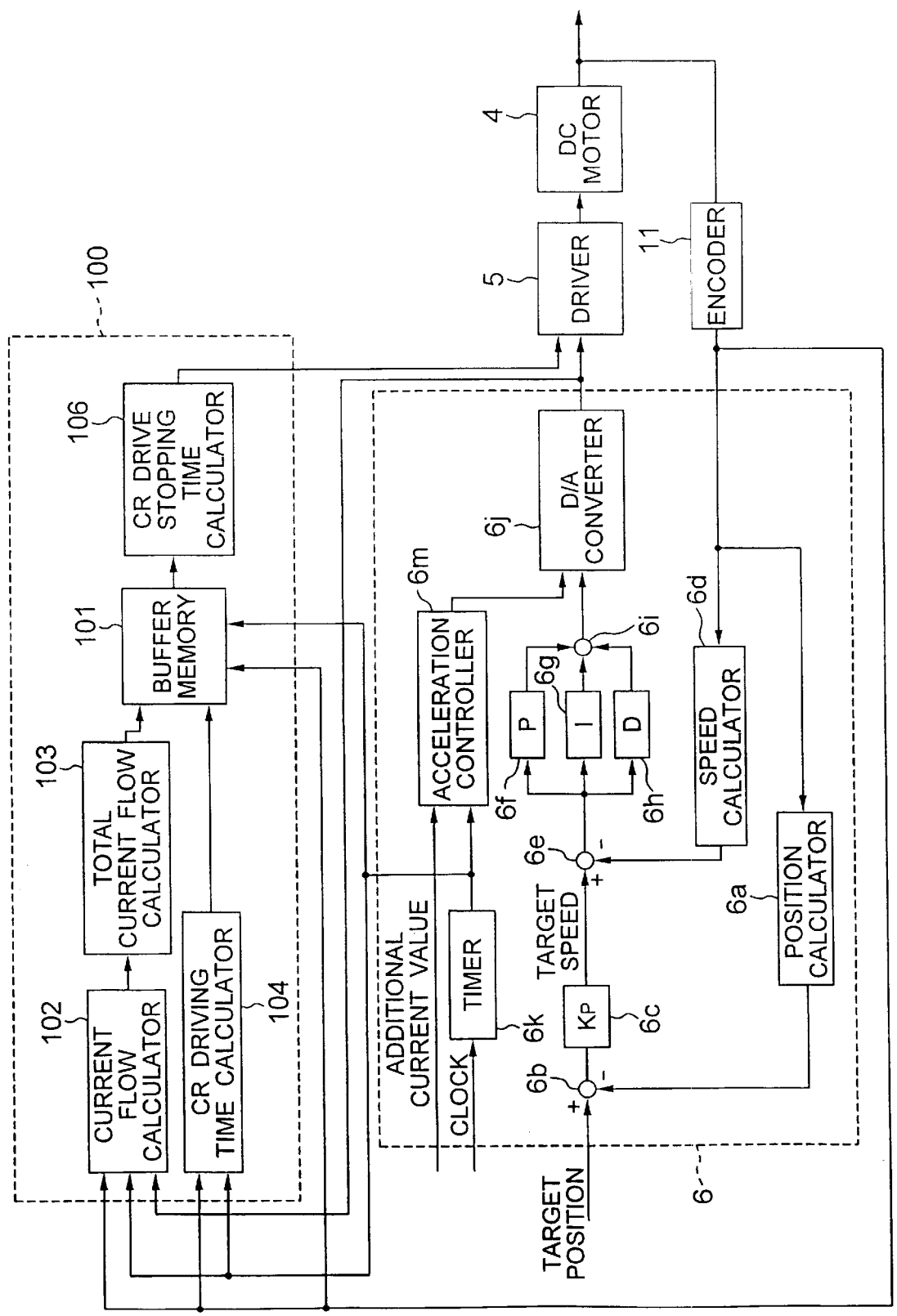
FIG. 16 is a block diagram that shows configuration of a DC motor control device according to the fourth embodiment of the invention.

FIG. 16 is a block diagram that shows configuration of a DC motor control device according to the fourth embodiment of the invention.

The DC motor control device according to the fourth embodiment of the invention shown in FIG. 16 is also composed of the DC unit 6 and the carriage drive stopping time calculating unit 100 added to the DC unit 6. Configuration of the DC unit 6 is the same as the first embodiment. However, configuration of the carriage drive stopping time calculating unit 100 is different from the first, second and third embodiments.

The carriage drive stopping time calculating unit 100 according to the fourth embodiment is composed of the current flow calculator 102 that calculates the DC motor current flow in each period between interrupt timings from the interval of the timer interrupt timings from the timer 6k or the encoder interrupt timings from the encoder 11 and the DAC output values at the timer interrupt timings and the encoder interrupt timings; the total current flow calculator 103 that calculates the DC motor total current flow in each continuous driving motion from the DC motor current flow in each period; the CR driving time calculator 104 that calculates a continuous driving motion time from the intervals between the timer interrupt timings or the encoder interrupt timings; the buffer memory 101 that renews and stores the DC motor total current flow and the driving motion time at each timer interrupt timing or encoder interrupt timing and outputs them under a predetermined drive stopping judgment condition; and the CR drive stopping time calculator 106 that calculates the CR drive stopping time to stop the CR driving for between one driving motion and its subsequent driving motion from the DC motor total current flow and the driving motion time.

In the DC motor control device according to the fourth embodiment of the invention, similarly to the second embodiment, after a driving motion starts, the DC motor current flow, the DC motor total current flow and the driving motion time are calculated by the current flow calculator 102, the current total flow calculator 103, the CR drive time calculator 104 at each interrupt timing, and the DC motor total current flow and the driving motion time are renewed and stored in the buffer memory 101 at each interrupt timing. Then, according to a predetermined drive stopping judgment condition, the DC motor total current flow and the driving motion time are output from the buffer memory 101 to the CR drive stopping time calculator 106.

Further, as explained with reference to the third embodiment, the CR drive stopping time Δt can be calculated from values of the DC motor total current flow $I_{total}$ and the driving motion time $T_{total}$ without the need for calculation of the DC motor current flow per unit time τ. Therefore, the carriage drive stopping time calculating unit 100 in the DC motor control device according to the fourth embodiment of the invention has the configuration omitting the unit time current flow calculator 105 from the carriage drive stopping time calculating unit 100 in the second embodiment.

Behaviors of the DC motor control device according to the fourth embodiment of the invention, i.e., proceedings of the DC motor control method according to the fourth embodiment of the invention, are identical to those of the third embodiment in calculation of respective numerical values and control actions after the DC motor total current flow and the driving motion time are output from the buffer memory 101 to the CR drive stopping time calculator 106, according to a predetermined drive stopping judgment condition. Therefore, the flow of proceedings of the DC motor control method according to the fourth embodiment appears identical to the flow shown in FIG. 15.

Further, behaviors of the DC motor control device according to the fourth embodiment of the invention, i.e., proceedings of the DC motor control method according to the fourth embodiment of the invention, are identical to those of the second embodiment excepting that the CR drive stopping time Δt is calculated from values of the DC motor total current flow $I_{total}$ and the driving motion time $T_{total}$ (steps S22 and S23) without calculating the DC motor current flow per unit time τ.

Figure 17:
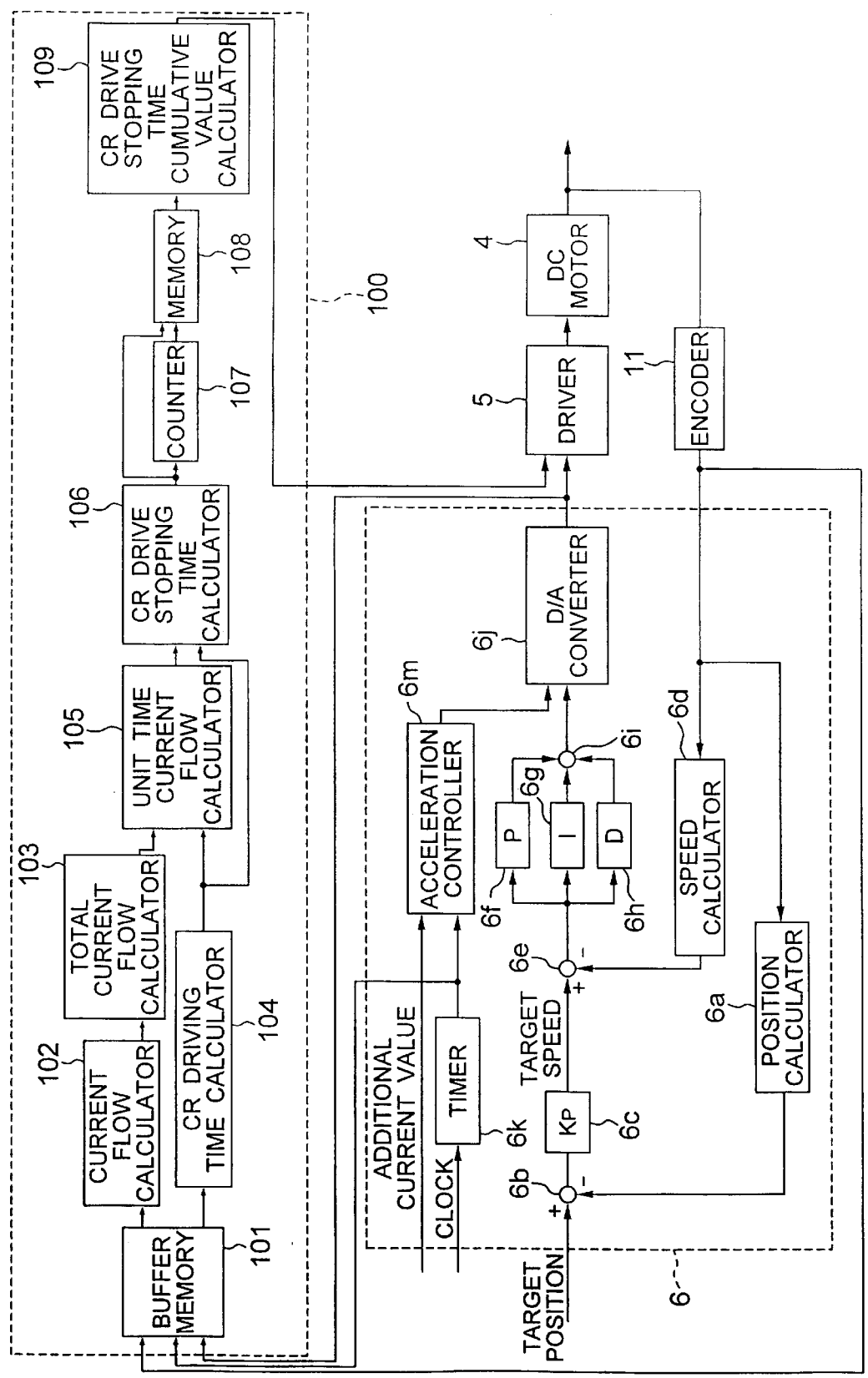
FIG. 17 is a block diagram that shows configuration of a DC motor control device according to the fifth embodiment of the invention.

FIG. 17 is a block diagram that shows configuration of a DC motor control device according to the fifth embodiment of the invention.

The DC motor control device according to the fifth embodiment of the invention shown in FIG. 17 is also composed of the DC unit 6 and the carriage drive stopping time calculating unit 100 added to the DC unit 6. Configuration of the DC unit 6 is the same as the first embodiment. However, configuration of the carriage drive stopping time calculating unit 100 is different from the first embodiment.

In the first to fourth embodiments already explained, the DC motor current flow per unit time, or the DC motor total current flow and the driving motion time, is calculated for each continuous driving motion of the DC motor, and a drive stopping time for stopping the DC motor for a time corresponding to the value calculated for each continuous driving motion is interposed each time before a subsequent driving motion starts after each continuous driving motion.

In contrast, the fifth through eighth embodiments explained below are characterized in calculating the DC motor current flow per unit time, or the DC motor total current flow and the driving motion time, is calculated every continuous driving motion and interposing a drive stopping time for stopping the DC motor for a time calculated by cumulating lengths of time corresponding to such values calculated for respective continuous driving motions every time before a plurality of continuous driving motions subsequent to a plurality of preceding continuous driving motions.

By interposing the drive stopping time every some continuous driving motions instead of every one continuous driving motion, heat generation of the DC motor can be alleviated while minimizing the increase of the driving motion time as a whole. For example, in the case where the drive stopping time calculated for one driving motion is a negative value and the drive stopping time calculated in the subsequent driving motion is a positive value, by canceling them one another, heat generation of the DC motor can be suppressed with a shorter drive stopping time.

The carriage drive stopping time calculating unit 100 in the fifth embodiment is composed of the buffer memory 101 that stores and holds the timer interrupt timings from the timer 6k, the encoder interrupt timings from the encoder 11, and the DAC output values at the timer interrupt timings and the encoder interrupt timings, and outputs them under a predetermined drive stopping judgment condition; the current flow calculator 102 that calculates the DC motor current flow in each period of interrupt timings from the interval of the timer interrupt timings or the encoder interrupt timings and the DAC output value; the total current flow calculator 103 that calculates the DC motor total current flow in one continuous driving motion from the DC motor current flow in each period; the CR driving time calculator 104 that calculates one continuous driving motion time from the intervals between the timer interrupt timings or the encoder interrupt timings; the unit time current flow calculator 105 that calculates the DC motor current flow per unit time in one continuous driving motion from the DC motor total current flow and the driving motion time in one continuous driving motion; the CR drive stopping time calculator 106 that calculates the CR drive stopping time to stop the CR driving for between one driving motion and the next driving motion from the driving motion time and the DC motor current flow per unit time in one continuous driving motion; a counter 107 that counts how many times the CR drive stopping time has been calculated; the buffer memory 108 that stores values of the CR drive stopping time over some predetermined occurrences (K times here) and outputs the values of the CR drive stopping time of K times when the CR drive stopping time has been calculated K times; and the CR drive stopping time cumulative value calculator 109 that calculates a cumulative value of the CR drive stopping time in K continuous driving motions.

Figure 18:
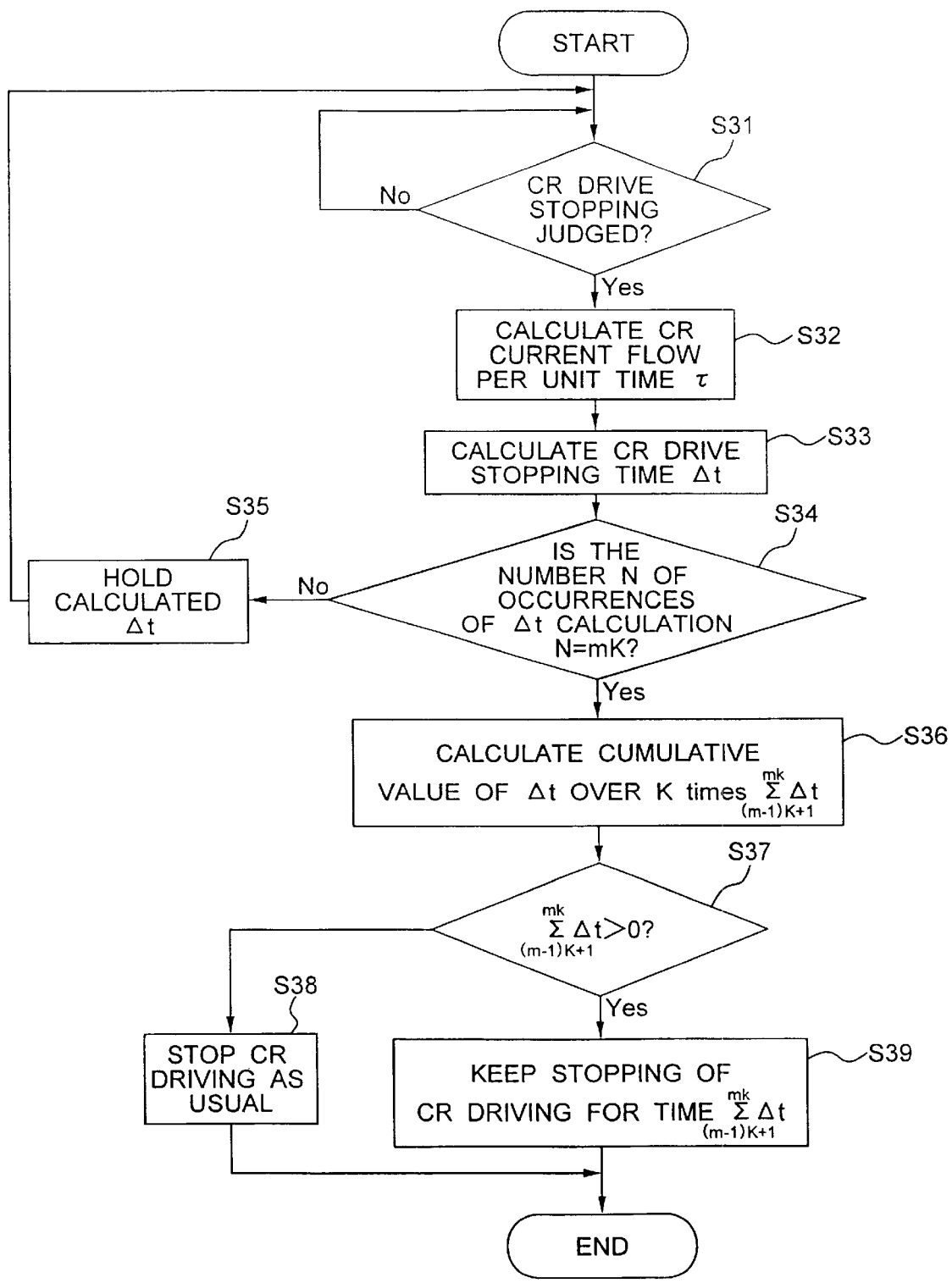
FIG. 18 is a flow chart that shows behaviors of the DC motor control device according to the fifth embodiment of the invention.

FIG. 18 is a flowchart that shows behaviors of the DC motor control device according to the fifth embodiment of the invention, i.e., proceedings of the DC motor control method according to the fifth embodiment of the invention. With reference to FIGS. 17 and 18, explanation is made about behaviors of the DC motor control device according to the fifth embodiment of the invention, i.e., the DC motor control method according to the fifth embodiment of the invention.

Calculation of numerical values and control actions in the steps of judgment of the CR drive stopping judgment condition (step S31), calculation of the DC motor current flow per unit time τ (step S32) and calculation of the CR drive stopping time Δt (step S33) are the same as those of the first embodiment.

When the CR drive stopping time Δt is calculated, the number of times N of calculation of the CR drive stopping time Δt are counted by the counter 107. The counter 107 issues an output instruction signal (step S34) only when the number of times N of calculation of the CR drive stopping time Δt becomes integer times of K (N=mK, where m=1, 2, . . . ).

On the other hand, the buffer memory 108 sequentially stores and holds calculated values of the CR drive stopping time Δt unless the output instruction signal is input from the counter 107 ( step S35).

Once the number of times N of calculation of the CR drive stopping time Δt becomes integer times of K (N=mK) and an output instruction signal is input from the counter 107 to the buffer memory 108, the buffer memory 108 sequentially outputs values of the CR drive stopping time Δt of preceding K times of calculation to the CR drive stopping time cumulative value calculator 109. The CR drive stopping time cumulative value calculator 109 adds all such values of the CR drive stopping time Δt over the preceding K times, and calculates the CR drive stopping time cumulative value ΣΔt in K continuous driving motions (step S36).

Then, in response to the calculated value of the CR drive stopping time cumulative value ΣΔt, subsequent drive control is executed. That is, it is reviewed whether the CR drive stopping time cumulative value ΣΔt is a positive value or not (ΣΔt>0) (step S37), and when the CR drive stopping time cumulative value ΣΔt is a value not larger than 0 (ΣΔt≦0), the flow moves to the subsequent driving motion in a usual manner immediately after the CR drive stops without interposing the CR drive stopping time (step S38). On the other hand, when the CR drive stopping time cumulative value ΣΔt is a positive value (ΣΔt>0), the carriage is kept stopping for the time of the CR drive stopping time cumulative value ΣΔt after the CR drive stops (step S39). Since the DC motor is cooled in the period of time of the CR drive stopping time cumulative value ΣΔt, insufficient flow of electric current to the DC motor caused by heat generation of the DC motor due to continuous motions can be prevented. Additionally, in the case where the drive stopping time calculated in one driving motion in K continuous driving motions is a negative value whereas the drive stopping time calculated in a later driving motion in K continuous driving motions is a positive value, they cancel one another, and therefore, heat generation of the DC motor can be suppressed with a shorter drive stopping time. After the time of the CR drive stopping time cumulative value ΣΔt is over, the flow moves to the next driving motion.

Figure 19:
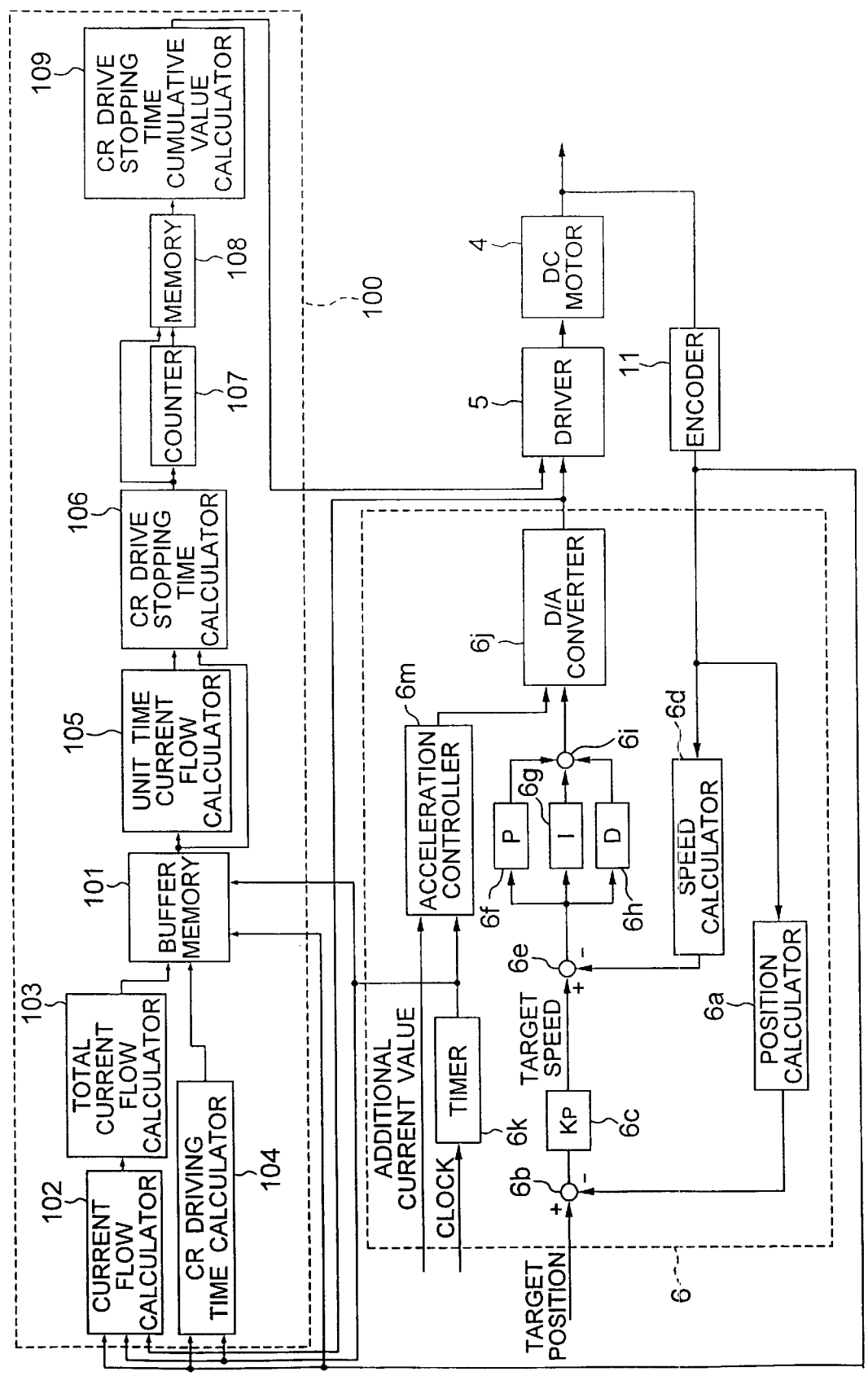
FIG. 19 is a block diagram that shows configuration of a DC motor control device according to the sixth embodiment of the invention.

FIG. 19 is a block diagram that shows configuration of a DC motor control device according to the sixth embodiment of the invention.

The DC motor control device according to the sixth embodiment of the invention shown in FIG. 19 is also composed of the DC unit 6 and the carriage drive stopping time calculating unit 100 added to the DC unit 6. Configuration of the DC unit 6 is the same as the first embodiment. However, configuration of the carriage drive stopping time calculating unit 100 is different from that of the fifth embodiment.

The carriage drive stopping time calculating unit 100 in the sixth embodiment is composed of the current flow calculator 102 that calculates the DC motor current flow in each period between interrupt timings from the interval of the timer interrupt timings from the timer 6k or the encoder interrupt timings from the encoder 11 and DAC output values at the timer interrupt timings and the encoder interrupt timings; the total current flow calculator 103 that calculates the DC motor total current flow in one continuous driving motion from the DC motor current flow in each period; the CR driving time calculator 104 that calculates one continuous driving motion time from the intervals between the timer interrupt timings or the encoder interrupt timings; the buffer memory 101 that renews and stores the DC motor total current flow and the driving motion time at each timer interrupt timing or encoder interrupt timing and outputs them under a predetermined drive stopping judgment condition; the unit time current flow calculator 105 that calculates the DC motor current flow per unit time from the DC motor total current flow and the driving motion time in one continuous driving motion; the CR drive stopping time calculator 106 that calculates the CR drive stopping time to stop the CR driving for between one driving motion and the next driving motion from the driving motion time and the DC motor current flow per unit time in one continuous driving motion; the counter 107 that counts how many times the CR drive stopping time has been calculated; the buffer memory 108 that stores values of the CR drive stopping time over some predetermined occurrences (K times here) and outputs the values of the CR drive stopping time of K times when the CR drive stopping time has been calculated K times; and the CR drive stopping time cumulative value calculator 109 that calculates a cumulative value of the CR drive stopping time in K continuous driving motions.

The DC motor control device according to the sixth embodiment of the invention is identical to the fifth embodiment in calculating the DC motor current flow per unit time in every some driving motions of the DC motor and interposing the drive stopping time to stop the DC motor for a time corresponding to the calculated value before the DC motor begins its subsequent driving motion.

As already explained, however, in the DC motor control device according to the fifth embodiment, like the first embodiment, the timer interrupt timings, the encoder interrupt timings and the DAC output values at respective interrupt timings are stored, and in accordance with the predetermined drive stopping judgment condition, the DC motor current flow, the DC motor total current flow and the driving motion time are calculated, and the DC motor current flow per unit time $\tau$ is calculated, and the CR drive stopping time is further calculated.

In contrast, in the DC motor driving device according to the sixth embodiment, similarly to the second embodiment, after a driving motion starts, the DC motor current flow, the DC motor total current flow and the driving motion time are calculated at respective interrupt timings by the current flow calculator 102, the current total flow calculator 103 and the CR drive time calculator 104, and the DC motor total current flow and the driving motion timing are renewed and stored in the buffer memory 101 at respective interrupt timings. Then, according to the predetermined drive stopping judgment condition, the DC motor total current flow and the driving motion time are output from the buffer memory 101 to the unit time current flow calculator 105, and the driving motion time is output from the buffer memory 101 to the CR drive stopping time calculator 106. Subsequent calculations of numerical values and control actions are identical to those of the fifth embodiment. Therefore, the flow of proceedings of the DC motor control method according to the sixth embodiment of the invention appears identical to the flow shown in FIG. 18.

Figure 20:
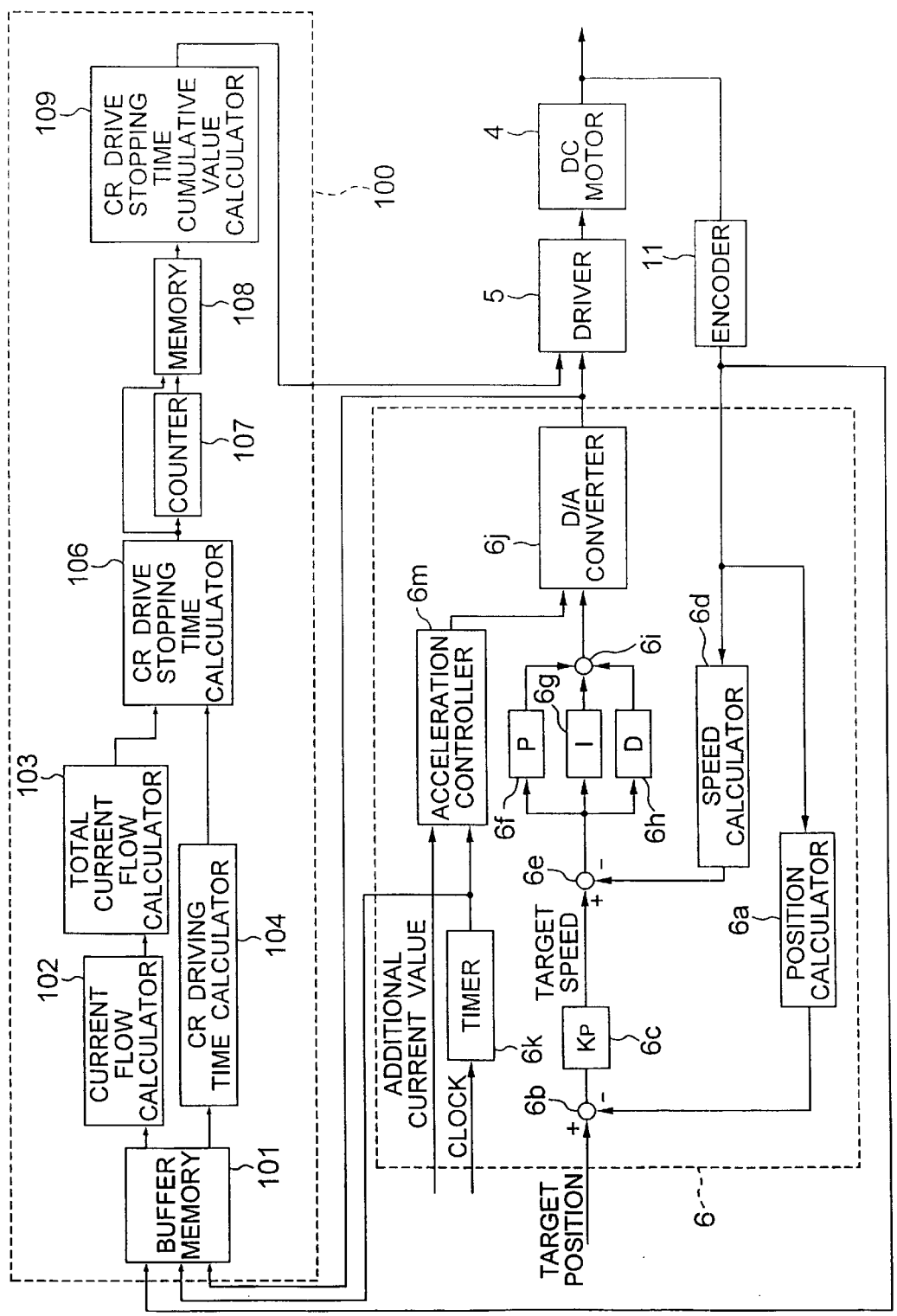
FIG. 20 is a block diagram that shows configuration of a DC motor control device according to the seventh embodiment of the invention.

FIG. 20 is a block diagram that shows configuration of a DC motor control device according to the seventh embodiment of the invention.

The DC motor control device according to the seventh embodiment of the invention shown in FIG. 20 is also composed of the DC unit 6 and the carriage drive stopping time calculating unit 100 added to the DC unit 6. Configuration of the DC unit 6 is the same as the first embodiment. However, configuration of the carriage drive stopping time calculating unit 100 is different from that of the fifth embodiment.

As already explained with reference to the third embodiment, the CR drive stopping time $\Delta t$ can be calculated from the DC motor total current flow $I_{total}$ and the driving motion time $T_{total}$ without the need for calculating the DC motor current flow per unit time $\tau$. Therefore, the carriage drive stopping time calculating unit 100 in the DC motor control device according to the seventh embodiment has the configuration omitting the unit time current flow calculator 105 from the carriage drive stopping time calculating unit 100 in the fifth embodiment.

That is, the carriage drive stopping time calculating unit 100 in the seventh embodiment is composed of the buffer memory 101 that stores and holds the timer interrupt timings from the timer 6k, the encoder interrupt timings from the encoder 11, and the DAC output values at the timer interrupt timings and the encoder interrupt timings, and outputs them under a predetermined drive stopping judgment condition; the current flow calculator 102 that calculates the DC motor current flow in each period of interrupt timings from the interval of the timer interrupt timings or the encoder interrupt timings and the DAC output value; the total current flow calculator 103 that calculates the DC motor total current flow in one continuous driving motion from the DC motor current flow in each period; the CR driving time calculator 104 that calculates one continuous driving motion time from the intervals between the timer interrupt timings or the encoder interrupt timings; the CR drive stopping time calculator 106 that calculates CR drive stopping time to stop the CR drive for between one driving motion and its subsequent driving motion from the DC motor total current flow and the driving motion time in one continuous driving motion; the counter 107 that counts how many times the CR drive stopping time has been calculated; the buffer memory 108 that stores values of the CR drive stopping time over some predetermined occurrences (K times here) and outputs the values of the CR drive stopping time of K times when the CR drive stopping time has been calculated K times; and the CR drive stopping time cumulative value calculator 109 that calculates a cumulative value of the CR drive stopping time in K continuous driving motions.

Figure 21:
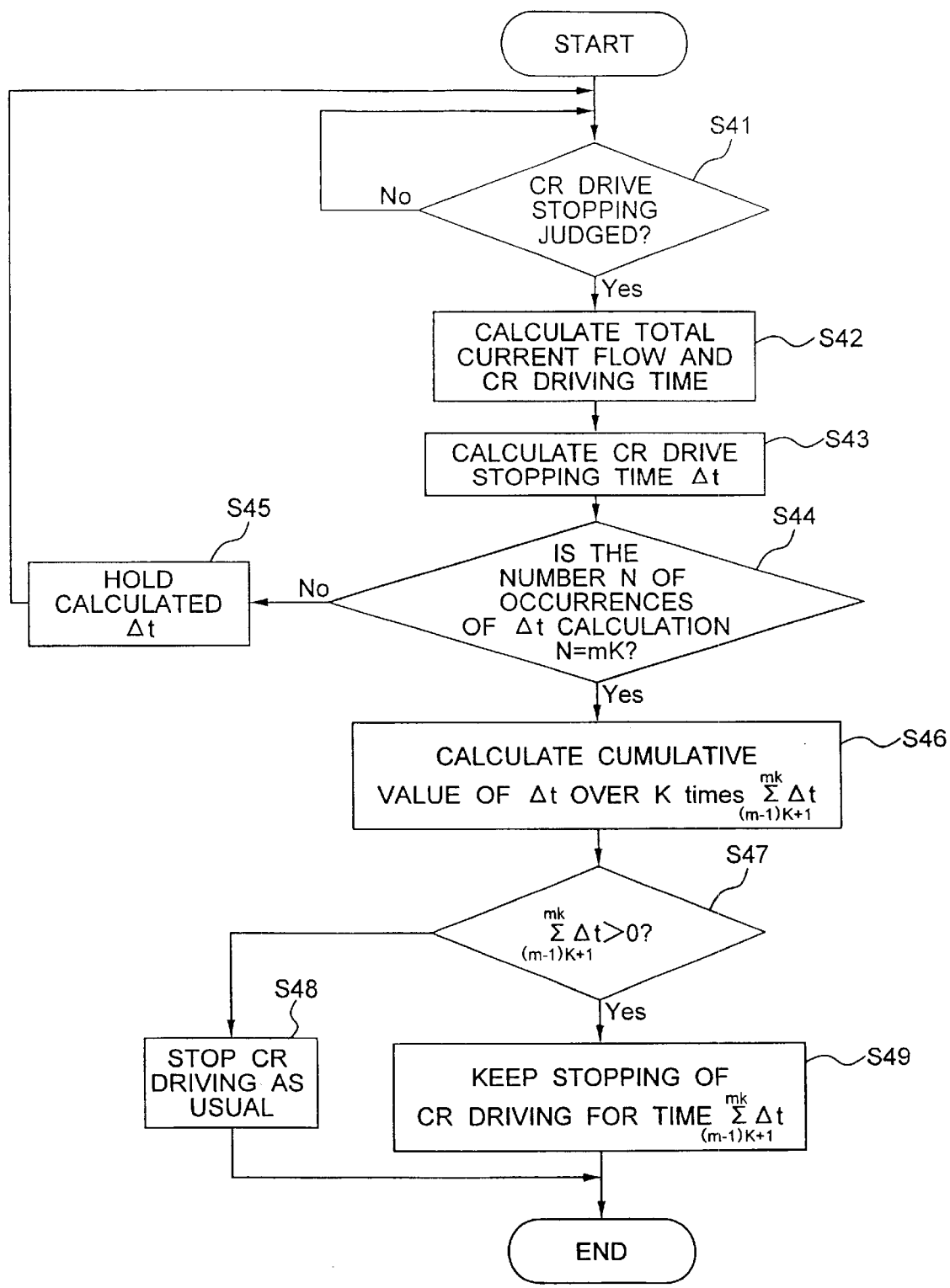
FIG. 21 is a flow chart that shows behaviors of the DC motor control device according to the seventh embodiment of the invention.

FIG. 21 is a flowchart that shows behaviors of the DC motor control device according to the seventh embodiment of the invention, i.e., proceedings of the DC motor control method according to the seventh embodiment of the invention.

Behaviors of the DC motor control device according to the seventh embodiment of the invention, i.e., proceedings of the DC motor control method according to the seventh embodiment of the invention are identical to those of the fifth embodiment excepting that the CR drive stopping time $\Delta t$ is calculated from values of the DC motor total current flow $I_{total}$ and the driving motion time $T_{total}$ (steps S42 and S43) without calculating the DC motor current flow per unit time $\tau$. It is as shown in the equation (1) in the explanation of the first embodiment, as explained above, that the CR drive stopping time $\Delta t$ can be calculated directly from values of the DC motor total current flow $I_{total}$ and the driving motion time $T_{total}$.

Figure 22:
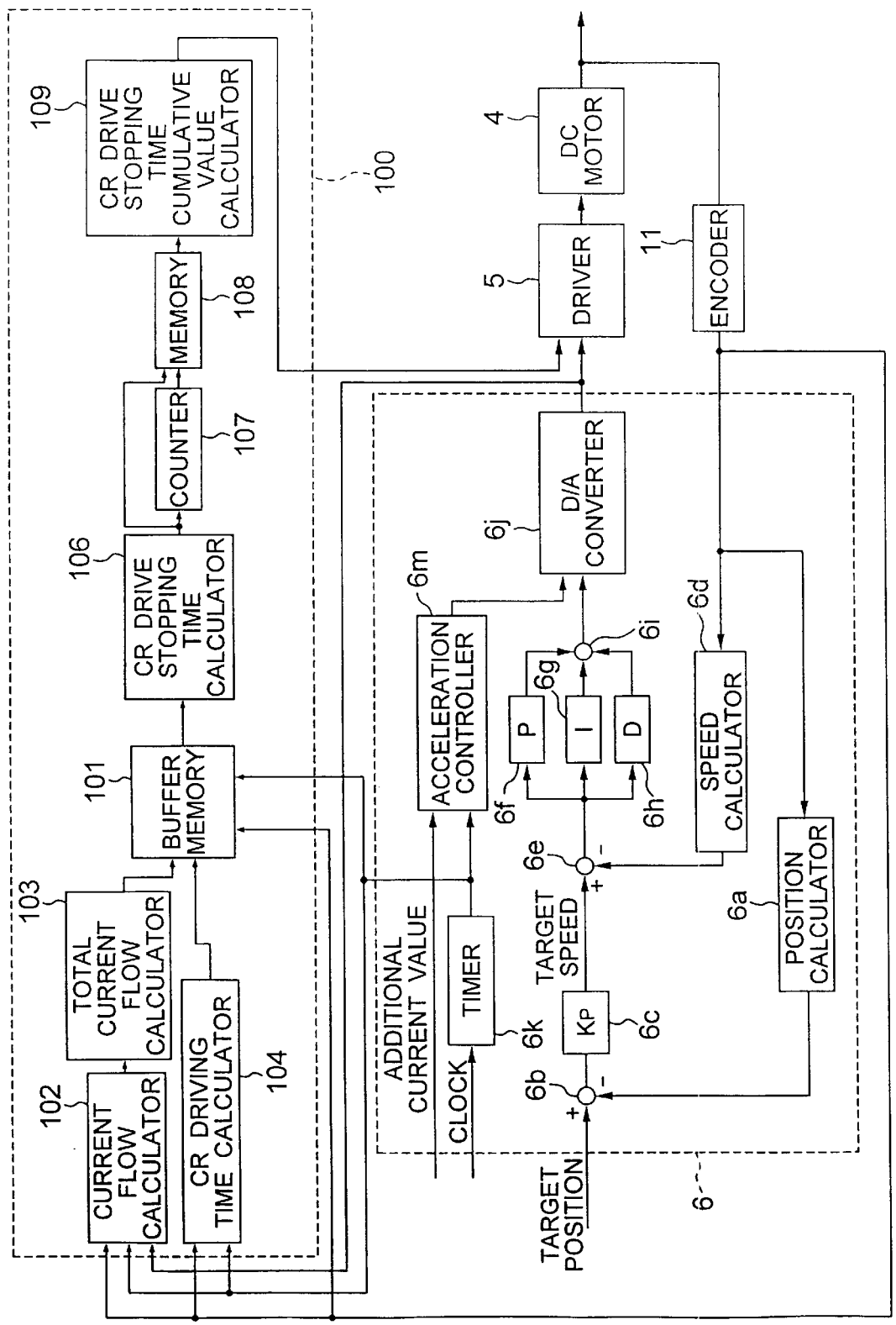
FIG. 22 is a block diagram that shows configuration of a DC motor control device according to the eighth embodiment of the invention.

FIG. 22 is a block diagram that shows configuration of a DC motor control device according to the eighth embodiment of the invention.

The DC motor control device according to the eighth embodiment of the invention shown in FIG. 21 is also composed of the DC unit 6 and the carriage drive stopping time calculating unit 100 added to the DC unit 6. Configuration of the DC unit 6 is the same as the first embodiment. However, configuration of the carriage drive stopping time calculating unit 100 is different from that of the fifth, sixth and seventh embodiments.

The carriage drive stopping time calculating unit 100 in the eighth embodiment is composed of the current flow calculator 102 that calculates the DC motor current flow in each period between interrupt timings from the interval of the timer interrupt timings from the timer 6k or the encoder interrupt timings from the encoder 11 and DAC output values at the timer interrupt timings and the encoder interrupt timings; the total current flow calculator 103 that calculates the DC motor total current flow in one continuous driving motion from the DC motor current flow in each period; the CR driving time calculator 104 that calculates one continuous driving motion time from the intervals between the timer interrupt timings or the encoder interrupt timings; the buffer memory 101 that renews and stores the DC motor total current flow and the driving motion time at each timer interrupt timing or encoder interrupt timing and outputs them under a predetermined drive stopping judgment condition; the CR drive stopping time calculator 106 that calculates the CR drive stopping time to stop the CR drive for between one driving motion and its subsequent driving motion from the DC motor total current flow and the driving motion time in one continuous driving motion; the counter 107 that counts how many times the CR drive stopping time has been calculated; buffer memory 108 that stores values of the CR drive stopping time over some predetermined occurrences (K times here) and outputs the values of the CR drive stopping time of K times when the CR drive stopping time has been calculated K times; and the CR drive stopping time cumulative value calculator 109 that calculates a cumulative value of the CR drive stopping time in K continuous driving motions.

The DC motor control device according to the eighth embodiment of the invention is identical to the fifth through seventh embodiments in calculating the DC motor current flow per unit time in every some driving motions of the DC motor and interposing the drive stopping time to stop the DC motor for a time corresponding to the calculated value before the DC motor begins its subsequent driving motion.

However, in the DC motor control device according to the eighth embodiment of the invention, similarly to the second and sixth embodiments, after a driving motion starts, the DC motor current flow, the DC motor total current flow and the driving motion time are calculated by the current flow calculator 102, the current total flow calculator 103 and the CR drive time calculator 104 at each interrupt timing, and the DC motor total current flow and the driving motion time are renewed and stored in the buffer memory 101 at each interrupt timing. Then, according to a predetermined drive stopping judgment condition, the DC motor total current flow and the driving motion time are output from the buffer memory 101 to the CR drive stopping time calculator 106.

Further, as explained with reference to the third embodiment, the CR drive stopping time Δt can be calculated from values of the DC motor total current flow $I_{total}$ and the driving motion time $T_{total}$ without the need for calculation of the DC motor current flow per unit time τ. Therefore, the carriage drive stopping time calculating unit 100 in the DC motor control device according to the eighth embodiment of the invention has the configuration omitting the unit time current flow calculator 105 from the carriage drive stopping time calculating unit 100 in the sixth embodiment.

Behaviors of the DC motor control device according to the eighth embodiment of the invention, i.e., proceedings of the DC motor control method according to the eighth embodiment of the invention, are identical to those of the seventh embodiment in calculation of respective numerical values and control actions after the DC motor total current flow and the driving motion time are output from the buffer memory to the CR drive stopping time calculator 106 according to a predetermined drive stopping judgment condition. Therefore, the flow of proceedings of the DC motor control method according to the eighth embodiment appears identical to the flow shown in FIG. 21.

Further, behaviors of the DC motor control device according to the eighth embodiment of the invention, i.e., proceedings of the DC motor control method according to the eighth embodiment of the invention, are identical to those of the sixth embodiment excepting that the CR drive stopping time Δt is calculated from values of the DC motor total current flow $I_{total}$ and the driving motion time $T_{total}$ (steps S42 and S43) without calculating the DC motor current flow per unit time t.

What is claimed is:

1. A DC motor control device comprising:
   a total current calculating device which calculates total current flow in a DC motor in one continuous driving motion every time when one continuous driving motion of the DC motor occurs;
   a driving time calculating device which calculates driving time of the DC motor in one continuous driving motion every time when one continuous driving motion of the DC motor occurs;
   an unit time current flow calculating device which calculates current flow in the DC motor per unit time of one continuous driving motion from said driving time of the DC motor and said total current flow in the DC motor; and
   a drive stopping time calculating device which calculates a drive stopping time to stop the DC motor for a time responsive to said driving time of the DC motor and said current flow in the DC motor per unit time every time when a subsequent driving motion starts after one continuous driving motion.

2. The DC motor control device according to claim 1 further comprising:
   an interrupt timing generating device which generates interrupt timings for storing the current value of the DC motor in predetermined intervals;
   a storage device which stores and holds said interrupt timings and said DC current values of the DC motor at said interrupt timings; and
   a current flow calculating device which calculates the current flow in the DC motor between respective said interrupt timings from said interrupt timings and the current values of the DC motor at said interrupt timings,
   said total current calculating device being configured to calculate said total current flow in the DC motor from said current flow in the DC motor,
   said driving time calculating device being configured to calculate said driving time of the DC motor from said interrupt timings,
   said storage device being configured to output said interrupt timings and said current values of the DC motor at said interrupt timings to said current flow calculating device and said driving time calculating device in accordance with a predetermined drive stopping judgment condition.

3. The DC motor control device according to claim 1 further comprising:
   an interrupt timing generating device which generates interrupt timings for taking in the current values of the DC motor in predetermined intervals;
   a DC motor current flow calculating device which calculates the current flow in the DC motor between respective said interrupt timings from said interrupt timings and the current values of the DC motor at said interrupt timings; and
   a storage device which stores and holds said total current flow in the DC motor and said driving time of the DC motor,
   said total current calculating device being configured to calculate said total current flow in the DC motor from said current flow of the DC motor,
   said driving time calculating device being configured to calculate said driving time of the DC motor from said interrupt timings,
   said storage device being configured to output said total current flow in the DC motor and said driving time of the DC motor to said unit time current flow calculating device and output said driving time of the DC motor to said drive stopping time calculating means in accordance with a predetermined drive stopping judgment condition.

4. A DC motor control method comprising:

a first process for calculating the driving motion time of one continuous driving motion and the current flow in a DC motor per unit time every time when one continuous driving motion of the DC motor occurs;

a second process for calculating a drive stopping time responsive to said driving motion time and said current flow in the DC motor per unit time every time when one continuous driving motion of the DC motor occurs; and a third process for stopping the DC motor for said drive stopping time before a subsequent driving motion starts after each continuous driving motion only when said drive stopping time is a positive value.

5. The DC motor control method according to claim 4 wherein said first process is started in response to a predetermined drive stopping judgment condition.

* * * * *